(12) United States Patent
Lin et al.

(10) Patent No.: US 12,332,502 B2
(45) Date of Patent: Jun. 17, 2025

(54) OPTICAL IMAGING LENS

(71) Applicant: GENIUS ELECTRONIC OPTICAL (XIAMEN) CO., LTD., Fujian (CN)

(72) Inventors: Hai Lin, Fujian (CN); Chuanbo Dong, Fujian (CN); Songchao Huang, Fujian (CN); Hung-Chien Hsieh, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 370 days.

(21) Appl. No.: 17/742,410

(22) Filed: May 12, 2022

(65) Prior Publication Data

US 2023/0176327 A1 Jun. 8, 2023

(30) Foreign Application Priority Data

Dec. 8, 2021 (CN) .......................... 202111490104.1

(51) Int. Cl.
  *G02B 9/64* (2006.01)
  *G02B 13/00* (2006.01)
(52) U.S. Cl.
  CPC ............ *G02B 9/64* (2013.01); *G02B 13/0045* (2013.01)
(58) Field of Classification Search
  CPC ............................. G02B 9/64; G02B 13/0045
  USPC ....................................................... 359/692
  See application file for complete search history.

(56) References Cited

U.S. PATENT DOCUMENTS

2020/0241255 A1\* 7/2020 Chen ........................ G02B 9/64

FOREIGN PATENT DOCUMENTS

| CN | 209911626 | 1/2020 |
| CN | 113759511 | 12/2021 |
| TW | 202119088 | 5/2021 |

OTHER PUBLICATIONS

"Office Action of Taiwan Counterpart Application", issued on Aug. 2, 2022, p. 1-p. 8.

\* cited by examiner

*Primary Examiner* — Wyatt A Stoffa
*Assistant Examiner* — Mitchell T Oestreich
(74) *Attorney, Agent, or Firm* — JCIPRNET

(57) ABSTRACT

An optical imaging lens includes first to seventh lens elements sequentially arranged along an optical axis from an object side to an image side, wherein each of the first lens element to the seventh lens element includes an object-side surface facing the object side and allowing an imaging ray to pass through and an image-side surface facing the image side and allowing the imaging ray to pass through. The first lens element has positive refracting power, and a periphery region of the image-side surface of the first lens element is concave. The second lens element has negative refracting power. An optical axis region of the image-side surface of the third lens element is convex. An optical axis region of the image-side surface of the fourth lens element is concave. The sixth lens element has negative refracting power. In particular, the optical imaging lens only has seven lens elements.

20 Claims, 28 Drawing Sheets

| First embodiment | | | | | | |
|---|---|---|---|---|---|---|
| EFL=6.518 mm, HFOV=37.019°, System length=7.917 mm, Fno=2.000, Image height=6.083 mm | | | | | | |
| Device | Surface | Radius of curvature (mm) | Thickness (mm) | Refractive index | Abbe number | Focal length (mm) |
| Object | | Infinity | Infinity | | | |
| Aperture 0 | | Infinity | -0.564 | | | |
| First lens element 1 | Object-side surface 15 | 2.597 | 1.151 | 1.545 | 55.987 | 6.168 |
| | Image-side surface 16 | 9.552 | 0.049 | | | |
| Second lens element 2 | Object-side surface 25 | 7.126 | 0.438 | 1.661 | 20.373 | -20.450 |
| | Image-side surface 26 | 4.566 | 0.481 | | | |
| Third lens element 3 | Object-side surface 35 | 10.974 | 0.521 | 1.545 | 55.987 | 19.942 |
| | Image-side surface 36 | -1478.314 | 0.295 | | | |
| Fourth lens element 4 | Object-side surface 45 | -49.128 | 0.690 | 1.671 | 19.480 | -71.346 |
| | Image-side surface 46 | 3022.918 | 0.420 | | | |
| Fifth lens element 5 | Object-side surface 55 | -4.615 | 0.870 | 1.535 | 55.690 | 8.397 |
| | Image-side surface 56 | -2.431 | 0.042 | | | |
| Sixth lens element 6 | Object-side surface 65 | -29.296 | 1.056 | 1.567 | 37.533 | -19.768 |
| | Image-side surface 66 | 18.539 | 0.955 | | | |
| Seventh lens element 7 | Object-side surface 75 | -4.008 | 0.200 | 1.535 | 55.690 | -5.369 |
| | Image-side surface 76 | 10.453 | 0.328 | | | |
| Filter 9 | Object-side surface 95 | Infinity | 0.251 | 1.563 | 51.300 | |
| | Image-side surface 96 | Infinity | 0.171 | | | |
| | Image plane 99 | Infinity | | | | |

FIG. 8

| Surface | K | $a_4$ | $a_6$ | $a_8$ | $a_{10}$ |
|---|---|---|---|---|---|
| 15 | 4.716353E-01 | -1.834924E-03 | 1.448524E-03 | -2.720614E-03 | 2.506618E-03 |
| 16 | 4.700067E+00 | -7.134823E-03 | 8.374830E-04 | 3.311020E-03 | -2.762105E-03 |
| 25 | 6.158268E+00 | -1.836781E-02 | 4.659262E-03 | -2.476999E-03 | 3.049307E-03 |
| 26 | 4.123591E+00 | -1.108198E-02 | 7.211521E-03 | -1.039032E-02 | 1.409640E-02 |
| 35 | 3.529751E+01 | -6.935614E-03 | -3.826852E-03 | 7.333768E-03 | -1.253279E-02 |
| 36 | 6.728905E+05 | -1.711048E-02 | -1.097526E-03 | 1.031141E-03 | -3.946271E-03 |
| 45 | 4.137515E+02 | -3.588166E-02 | 1.198684E-02 | -1.468565E-02 | 1.003752E-02 |
| 46 | 0.000000E+00 | -2.951407E-02 | 1.247593E-02 | -8.554786E-03 | 3.694963E-03 |
| 55 | 3.955347E-01 | -1.090706E-02 | 7.870189E-03 | -1.072852E-03 | -1.217293E-03 |
| 56 | -1.006798E+00 | 1.603349E-02 | -6.993931E-03 | 4.069787E-03 | -1.468580E-03 |
| 65 | 0.000000E+00 | -1.222212E-03 | -6.528750E-03 | 2.018195E-03 | -5.389645E-04 |
| 66 | -1.041183E+02 | -7.485098E-03 | -2.245880E-04 | 4.594526E-05 | -2.144779E-05 |
| 75 | -1.908097E+01 | -3.321022E-02 | 7.350141E-03 | -1.449633E-03 | 1.918722E-04 |
| 76 | 1.000239E+00 | -1.756998E-02 | 2.461438E-03 | -3.231145E-04 | 2.839562E-05 |
| Surface | $a_{12}$ | $a_{14}$ | $a_{16}$ | $a_{18}$ | $a_{20}$ |
| 15 | -1.425061E-03 | 5.062395E-04 | -1.084198E-04 | 1.235337E-05 | -4.928778E-07 |
| 16 | 1.265971E-03 | -3.273629E-04 | 4.590744E-05 | 1.410425E-07 | -9.226921E-08 |
| 25 | -2.256647E-03 | 9.965896E-04 | -2.533147E-04 | 3.490541E-05 | -1.591896E-06 |
| 26 | -1.129500E-02 | 5.686447E-03 | -1.691268E-03 | 2.682405E-04 | -1.631950E-05 |
| 35 | 1.138201E-02 | -6.129884E-03 | 1.947032E-03 | -3.411591E-04 | 2.452302E-05 |
| 36 | 3.330220E-03 | -1.540588E-03 | 4.097783E-04 | -5.892352E-05 | 3.065383E-06 |
| 45 | -4.794216E-03 | 1.580464E-03 | -3.230663E-04 | 3.696194E-05 | -1.540828E-06 |
| 46 | -1.167287E-03 | 2.774124E-04 | -4.323371E-05 | 3.744130E-06 | -9.775969E-08 |
| 55 | 5.372334E-04 | -9.094672E-05 | 6.475822E-06 | -4.932177E-08 | -3.130817E-09 |
| 56 | 3.062115E-04 | -3.554024E-05 | 2.272593E-06 | -7.452014E-08 | 7.962290E-10 |
| 65 | 9.365342E-05 | -1.049164E-05 | 6.819269E-07 | -2.694827E-08 | -6.831610E-10 |
| 66 | 5.622785E-06 | -7.452268E-07 | 5.260687E-08 | -1.943535E-09 | 2.935400E-11 |
| 75 | -1.535693E-05 | 7.456076E-07 | -2.156886E-08 | 3.440210E-10 | -2.282000E-12 |
| 76 | -1.564854E-06 | 5.399031E-08 | -1.134990E-09 | 1.364900E-11 | -8.100000E-14 |

FIG. 9

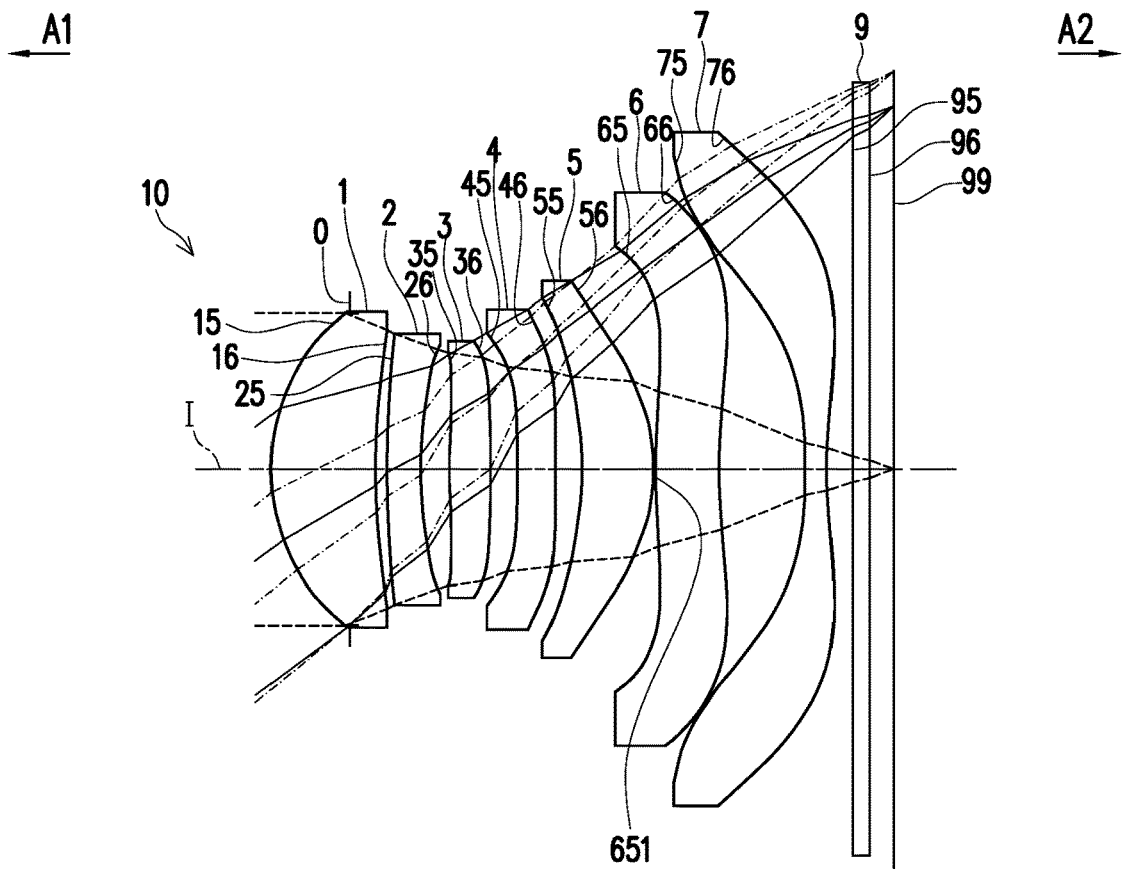
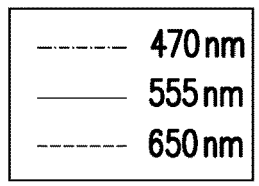
FIG. 10
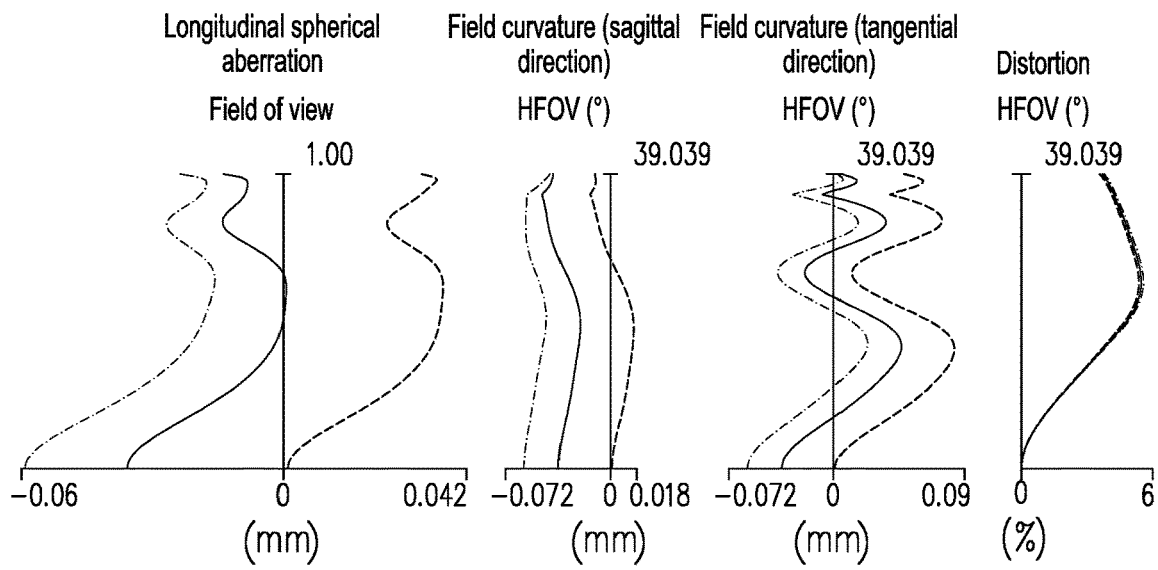
FIG. 11A   FIG. 11B   FIG. 11C   FIG. 11D

| Second embodiment | | | | | | |
|---|---|---|---|---|---|---|
| EFL=6.442 mm, HFOV=39.039°, System length=8.554 mm, Fno=1.500, Image height=5.465 mm | | | | | | |
| Device | Surface | Radius of curvature (mm) | Thickness (mm) | Refractive index | Abbe number | Focal length (mm) |
| Object | | Infinity | Infinity | | | |
| Aperture 0 | | Infinity | -1.082 | | | |
| First lens element 1 | Object-side surface 15 | 2.900 | 1.439 | 1.531 | 49.620 | 7.115 |
| | Image-side surface 16 | 10.186 | 0.153 | | | |
| Second lens element 2 | Object-side surface 25 | 10.786 | 0.464 | 1.661 | 20.373 | -19.956 |
| | Image-side surface 26 | 5.856 | 0.400 | | | |
| Third lens element 3 | Object-side surface 35 | 12.585 | 0.559 | 1.531 | 49.620 | 22.236 |
| | Image-side surface 36 | -201.880 | 0.374 | | | |
| Fourth lens element 4 | Object-side surface 45 | -41.746 | 0.515 | 1.531 | 49.620 | -65.225 |
| | Image-side surface 46 | 209.355 | 0.360 | | | |
| Fifth lens element 5 | Object-side surface 55 | -5.600 | 0.993 | 1.531 | 49.620 | 7.356 |
| | Image-side surface 56 | -2.449 | 0.030 | | | |
| Sixth lens element 6 | Object-side surface 65 | 14.403 | 0.871 | 1.671 | 19.480 | -37.018 |
| | Image-side surface 66 | 8.926 | 1.184 | | | |
| Seventh lens element 7 | Object-side surface 75 | -8.258 | 0.295 | 1.531 | 49.620 | -6.977 |
| | Image-side surface 76 | 6.856 | 0.335 | | | |
| Filter 9 | Object-side surface 95 | Infinity | 0.251 | 1.563 | 51.300 | |
| | Image-side surface 96 | Infinity | 0.331 | | | |
| | Image plane 99 | Infinity | | | | |

FIG. 12

| Surface | K | $a_4$ | $a_6$ | $a_8$ | $a_{10}$ |
|---|---|---|---|---|---|
| 15 | 4.645176E-01 | -2.571882E-03 | 1.748450E-03 | -2.746220E-03 | 2.485476E-03 |
| 16 | 6.454358E+00 | -6.291504E-03 | -1.427720E-04 | 3.159882E-03 | -2.755519E-03 |
| 25 | 8.732872E+00 | -1.627862E-02 | 5.188023E-03 | -2.635325E-03 | 2.983395E-03 |
| 26 | 3.551614E+00 | -1.268228E-02 | 7.840009E-03 | -1.056126E-02 | 1.388550E-02 |
| 35 | 1.490736E+01 | -1.233937E-02 | -3.236307E-03 | 7.199908E-03 | -1.261399E-02 |
| 36 | 1.228242E+04 | -1.385092E-02 | -6.206996E-04 | 1.179016E-03 | -3.892197E-03 |
| 45 | 2.013786E+02 | -3.451246E-02 | 1.224042E-02 | -1.469530E-02 | 1.002194E-02 |
| 46 | 1.952973E+02 | -2.699594E-02 | 1.242362E-02 | -8.580662E-03 | 3.704656E-03 |
| 55 | -1.579770E-01 | -9.795268E-03 | 8.513421E-03 | -1.005653E-03 | -1.204805E-03 |
| 56 | -8.258147E-01 | 1.408312E-02 | -7.181145E-03 | 4.049390E-03 | -1.464759E-03 |
| 65 | -3.226977E+01 | 4.575136E-03 | -6.131919E-03 | 2.063920E-03 | -5.326031E-04 |
| 66 | 2.804203E+00 | -6.899706E-03 | -3.078770E-04 | 4.706783E-05 | -2.104866E-05 |
| 75 | -4.288941E+01 | -3.317658E-02 | 7.370285E-03 | -1.449286E-03 | 1.918559E-04 |
| 76 | -4.131638E-01 | -1.830972E-02 | 2.423213E-03 | -3.247308E-04 | 2.835886E-05 |
| Surface | $a_{12}$ | $a_{14}$ | $a_{16}$ | $a_{18}$ | $a_{20}$ |
| 15 | -1.429373E-03 | 5.070982E-04 | -1.076175E-04 | 1.250445E-05 | -6.152973E-07 |
| 16 | 1.267991E-03 | -3.311806E-04 | 4.256409E-05 | -1.205390E-06 | -1.562366E-07 |
| 25 | -2.271994E-03 | 9.945267E-04 | -2.525286E-04 | 3.504266E-05 | -2.054432E-06 |
| 26 | -1.136521E-02 | 5.678065E-03 | -1.684195E-03 | 2.720607E-04 | -1.813754E-05 |
| 35 | 1.135690E-02 | -6.121247E-03 | 1.952467E-03 | -3.403552E-04 | 2.507553E-05 |
| 36 | 3.323717E-03 | -1.539571E-03 | 4.104884E-04 | -5.873338E-05 | 3.502867E-06 |
| 45 | -4.799164E-03 | 1.577765E-03 | -3.234932E-04 | 3.650584E-05 | -1.674730E-06 |
| 46 | -1.168672E-03 | 2.769999E-04 | -4.341484E-05 | 3.694475E-06 | -1.153074E-07 |
| 55 | 5.357258E-04 | -9.139648E-05 | 6.443902E-06 | -5.503571E-08 | -8.471003E-09 |
| 56 | 3.056069E-04 | -3.556558E-05 | 2.279866E-06 | -7.410416E-08 | 6.343530E-10 |
| 65 | 9.388778E-05 | -1.050083E-05 | 6.906054E-07 | -2.333526E-08 | 2.659460E-10 |
| 66 | 5.635056E-06 | -7.450765E-07 | 5.265247E-08 | -1.938765E-09 | 2.944200E-11 |
| 75 | -1.535782E-05 | 7.455492E-07 | -2.157757E-08 | 3.433570E-10 | -2.334000E-12 |
| 76 | -1.563361E-06 | 5.406806E-08 | -1.134190E-09 | 1.360000E-11 | -7.900000E-14 |

FIG. 13

| Third embodiment ||||||
|---|---|---|---|---|---|---|
| EFL=6.418 mm, HFOV=39.039°, System length=8.477 mm, Fno=1.500, Image height=5.615 mm |||||||
| Device | Surface | Radius of curvature (mm) | Thickness (mm) | Refractive index | Abbe number | Focal length (mm) |
| Object | | Infinity | Infinity | | | |
| Aperture 0 | | Infinity | -1.082 | | | |
| First lens element 1 | Object-side surface 15 | 2.913 | 1.381 | 1.545 | 55.987 | 6.952 |
| | Image-side surface 16 | 10.401 | 0.155 | | | |
| Second lens element 2 | Object-side surface 25 | 11.171 | 0.526 | 1.661 | 20.373 | -18.382 |
| | Image-side surface 26 | 5.736 | 0.466 | | | |
| Third lens element 3 | Object-side surface 35 | 12.354 | 0.600 | 1.545 | 55.987 | 21.322 |
| | Image-side surface 36 | -200.188 | 0.370 | | | |
| Fourth lens element 4 | Object-side surface 45 | -91.933 | 0.619 | 1.531 | 49.620 | -88.333 |
| | Image-side surface 46 | 96.823 | 0.425 | | | |
| Fifth lens element 5 | Object-side surface 55 | -5.436 | 0.697 | 1.531 | 49.620 | 7.763 |
| | Image-side surface 56 | -2.455 | 0.027 | | | |
| Sixth lens element 6 | Object-side surface 65 | 17.102 | 0.980 | 1.671 | 19.480 | -23.531 |
| | Image-side surface 66 | 8.060 | 1.178 | | | |
| Seventh lens element 7 | Object-side surface 75 | -8.859 | 0.404 | 1.531 | 49.620 | -6.491 |
| | Image-side surface 76 | 5.771 | 0.200 | | | |
| Filter 9 | Object-side surface 95 | Infinity | 0.251 | 1.563 | 51.300 | |
| | Image-side surface 96 | Infinity | 0.196 | | | |
| | Image plane 99 | Infinity | | | | |

FIG. 16

| Surface | K | $a_4$ | $a_6$ | $a_8$ | $a_{10}$ |
|---|---|---|---|---|---|
| 15 | 4.592838E-01 | -2.382966E-03 | 1.782166E-03 | -2.729543E-03 | 2.481361E-03 |
| 16 | 3.685602E+00 | -6.646032E-03 | -1.850089E-04 | 3.165449E-03 | -2.755709E-03 |
| 25 | 9.020145E+00 | -1.653982E-02 | 5.005763E-03 | -2.596034E-03 | 2.983092E-03 |
| 26 | 4.248838E+00 | -1.179947E-02 | 7.905164E-03 | -1.046153E-02 | 1.392329E-02 |
| 35 | 1.821568E+01 | -1.227045E-02 | -3.129489E-03 | 7.215761E-03 | -1.260798E-02 |
| 36 | 1.283478E+04 | -1.550313E-02 | -8.012467E-04 | 1.227849E-03 | -3.904297E-03 |
| 45 | 6.690305E+02 | -3.361421E-02 | 1.234188E-02 | -1.466621E-02 | 1.002702E-02 |
| 46 | 1.821896E+03 | -2.699128E-02 | 1.225753E-02 | -8.571512E-03 | 3.698955E-03 |
| 55 | -4.147053E-01 | -9.726941E-03 | 8.584880E-03 | -9.986419E-04 | -1.214504E-03 |
| 56 | -8.166952E-01 | 1.565529E-02 | -7.106350E-03 | 4.036804E-03 | -1.470745E-03 |
| 65 | -6.160713E+00 | 3.184111E-03 | -6.527898E-03 | 2.099622E-03 | -5.309067E-04 |
| 66 | 2.846428E+00 | -8.002231E-03 | -2.738793E-04 | 4.386325E-05 | -2.108998E-05 |
| 75 | -8.506050E+01 | -3.317545E-02 | 7.363447E-03 | -1.448934E-03 | 1.918917E-04 |
| 76 | -2.976043E-01 | -1.812916E-02 | 2.417286E-03 | -3.241582E-04 | 2.838270E-05 |
| Surface | $a_{12}$ | $a_{14}$ | $a_{16}$ | $a_{18}$ | $a_{20}$ |
| 15 | -1.429163E-03 | 5.072573E-04 | -1.076292E-04 | 1.249878E-05 | -6.143547E-07 |
| 16 | 1.268418E-03 | -3.312917E-04 | 4.259999E-05 | -1.175409E-06 | -1.645940E-07 |
| 25 | -2.272775E-03 | 9.955064E-04 | -2.525238E-04 | 3.497945E-05 | -2.056325E-06 |
| 26 | -1.136515E-02 | 5.679209E-03 | -1.683788E-03 | 2.720121E-04 | -1.812582E-05 |
| 35 | 1.137268E-02 | -6.124404E-03 | 1.950770E-03 | -3.397337E-04 | 2.489355E-05 |
| 36 | 3.332218E-03 | -1.542138E-03 | 4.095203E-04 | -5.851470E-05 | 3.507540E-06 |
| 45 | -4.799019E-03 | 1.579091E-03 | -3.236125E-04 | 3.668555E-05 | -1.684402E-06 |
| 46 | -1.166902E-03 | 2.771861E-04 | -4.338278E-05 | 3.687602E-06 | -1.159938E-07 |
| 55 | 5.366171E-04 | -9.118719E-05 | 6.410447E-06 | -6.505354E-08 | -6.364446E-09 |
| 56 | 3.061622E-04 | -3.553037E-05 | 2.273756E-06 | -7.459570E-08 | 7.393500E-10 |
| 65 | 9.361954E-05 | -1.052320E-05 | 6.887147E-07 | -2.336616E-08 | 2.924930E-10 |
| 66 | 5.640902E-06 | -7.446796E-07 | 5.262235E-08 | -1.941867E-09 | 2.962800E-11 |
| 75 | -1.535710E-05 | 7.455223E-07 | -2.157796E-08 | 3.433080E-10 | -2.323000E-12 |
| 76 | -1.564665E-06 | 5.401265E-08 | -1.133696E-09 | 1.371700E-11 | -7.800000E-14 |

FIG. 17

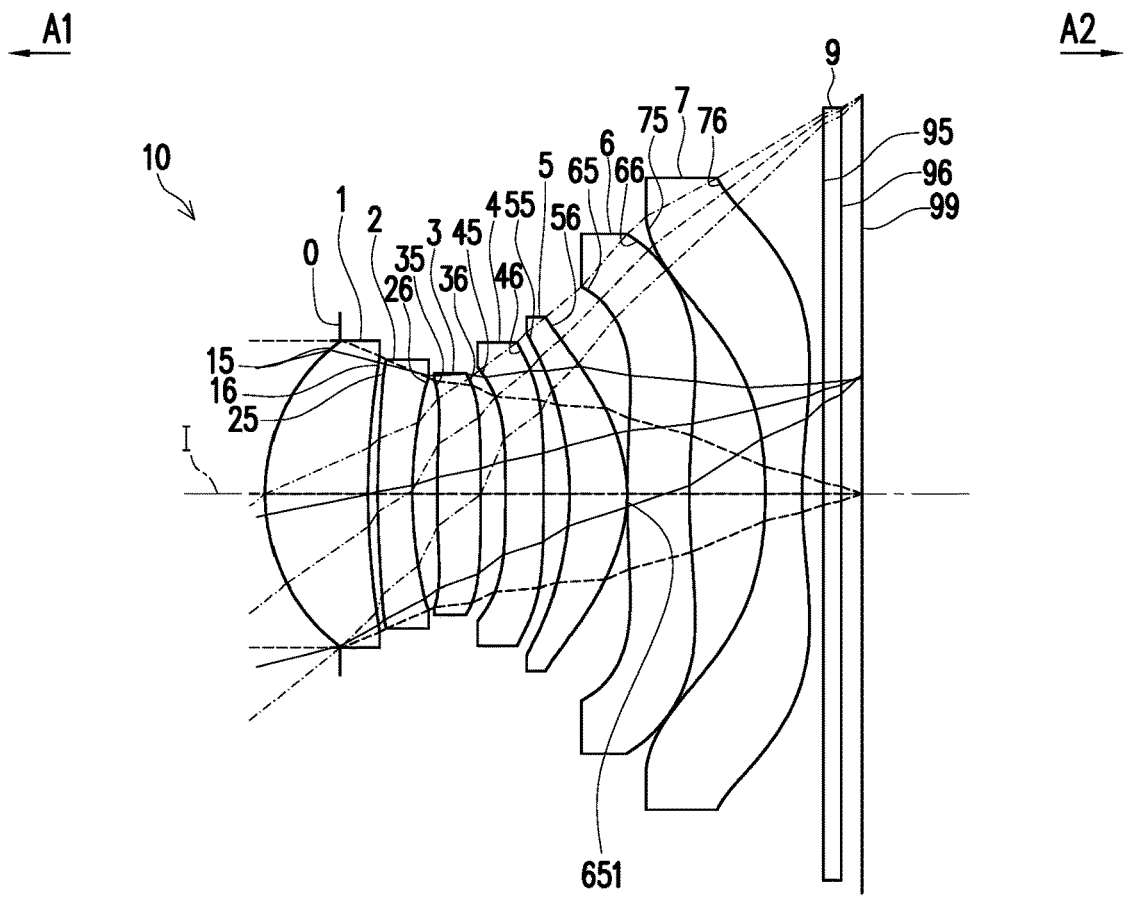
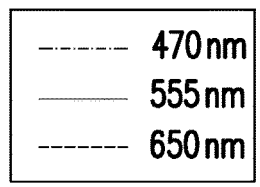
FIG. 18
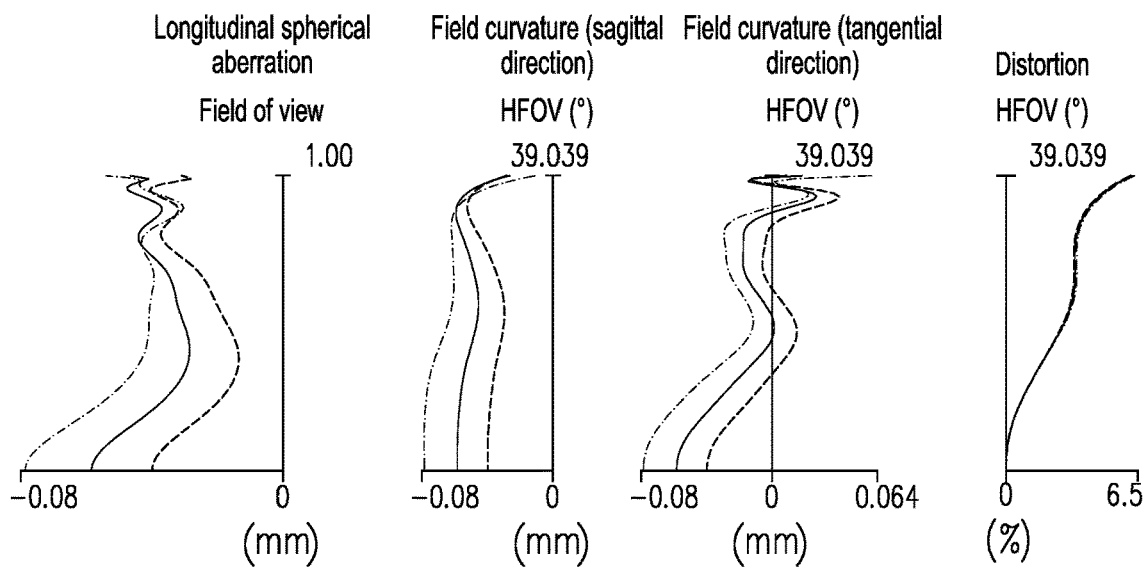
FIG. 19A   FIG. 19B   FIG. 19C   FIG. 19D

| Fourth embodiment | | | | | | |
|---|---|---|---|---|---|---|
| EFL=6.652 mm, HFOV=39.039°, System length=8.677 mm, Fno=1.500, Image height=5.818 mm | | | | | | |
| Device | Surface | Radius of curvature (mm) | Thickness (mm) | Refractive index | Abbe number | Focal length (mm) |
| Object | | Infinity | Infinity | | | |
| Aperture 0 | | Infinity | -1.082 | | | |
| First lens element 1 | Object-side surface 15 | 2.900 | 1.488 | 1.545 | 55.987 | 6.943 |
| | Image-side surface 16 | 10.088 | 0.139 | | | |
| Second lens element 2 | Object-side surface 25 | 10.937 | 0.505 | 1.661 | 20.373 | -19.983 |
| | Image-side surface 26 | 5.897 | 0.360 | | | |
| Third lens element 3 | Object-side surface 35 | 12.879 | 0.633 | 1.545 | 55.987 | 22.311 |
| | Image-side surface 36 | -223.191 | 0.360 | | | |
| Fourth lens element 4 | Object-side surface 45 | -38.849 | 0.551 | 1.671 | 19.480 | -50.136 |
| | Image-side surface 46 | 271.905 | 0.385 | | | |
| Fifth lens element 5 | Object-side surface 55 | -4.729 | 0.839 | 1.535 | 55.690 | 7.513 |
| | Image-side surface 56 | -2.312 | 0.011 | | | |
| Sixth lens element 6 | Object-side surface 65 | 16.763 | 0.902 | 1.671 | 19.480 | -36.952 |
| | Image-side surface 66 | 9.822 | 1.106 | | | |
| Seventh lens element 7 | Object-side surface 75 | -6.160 | 0.534 | 1.535 | 55.690 | -5.848 |
| | Image-side surface 76 | 6.604 | 0.307 | | | |
| Filter 9 | Object-side surface 95 | Infinity | 0.251 | 1.563 | 51.300 | |
| | Image-side surface 96 | Infinity | 0.303 | | | |
| | Image plane 99 | Infinity | | | | |

FIG. 20

| Surface | K | $a_4$ | $a_6$ | $a_8$ | $a_{10}$ |
|---|---|---|---|---|---|
| 15 | 4.570254E-01 | -2.616371E-03 | 1.719734E-03 | -2.739518E-03 | 2.480483E-03 |
| 16 | 5.693627E+00 | -6.284025E-03 | -1.618195E-04 | 3.169588E-03 | -2.755594E-03 |
| 25 | 1.187271E+01 | -1.611115E-02 | 5.102370E-03 | -2.592720E-03 | 2.978360E-03 |
| 26 | 3.332773E+00 | -1.279572E-02 | 7.691709E-03 | -1.057047E-02 | 1.388937E-02 |
| 35 | 1.637216E+01 | -1.239749E-02 | -3.216313E-03 | 7.183444E-03 | -1.262506E-02 |
| 36 | 1.306312E+04 | -1.390733E-02 | -6.512257E-04 | 1.213778E-03 | -3.908492E-03 |
| 45 | 2.911909E+02 | -3.335436E-02 | 1.229453E-02 | -1.469890E-02 | 1.001963E-02 |
| 46 | 1.911900E+03 | -2.718945E-02 | 1.237464E-02 | -8.549074E-03 | 3.698050E-03 |
| 55 | -3.461806E-01 | -9.738993E-03 | 8.596550E-03 | -1.009295E-03 | -1.214027E-03 |
| 56 | -8.279101E-01 | 1.454592E-02 | -7.149746E-03 | 4.060813E-03 | -1.468455E-03 |
| 65 | -1.739845E+01 | 3.702796E-03 | -6.189902E-03 | 2.071202E-03 | -5.337337E-04 |
| 66 | 3.095016E+00 | -7.160572E-03 | -3.004796E-04 | 4.696015E-05 | -2.110428E-05 |
| 75 | -4.669308E+01 | -3.331776E-02 | 7.362512E-03 | -1.448840E-03 | 1.918987E-04 |
| 76 | -4.144339E-01 | -1.853519E-02 | 2.416619E-03 | -3.239653E-04 | 2.838949E-05 |
| Surface | $a_{12}$ | $a_{14}$ | $a_{16}$ | $a_{18}$ | $a_{20}$ |
| 15 | -1.429232E-03 | 5.072391E-04 | -1.076352E-04 | 1.249754E-05 | -6.144351E-07 |
| 16 | 1.267988E-03 | -3.314889E-04 | 4.255478E-05 | -1.173301E-06 | -1.590071E-07 |
| 25 | -2.274350E-03 | 9.953225E-04 | -2.524715E-04 | 3.501312E-05 | -2.048806E-06 |
| 26 | -1.137228E-02 | 5.678326E-03 | -1.683815E-03 | 2.719843E-04 | -1.817605E-05 |
| 35 | 1.136705E-02 | -6.125087E-03 | 1.951149E-03 | -3.395360E-04 | 2.493756E-05 |
| 36 | 3.333633E-03 | -1.540920E-03 | 4.099447E-04 | -5.845822E-05 | 3.469258E-06 |
| 45 | -4.801063E-03 | 1.578152E-03 | -3.239012E-04 | 3.662447E-05 | -1.684632E-06 |
| 46 | -1.167765E-03 | 2.770050E-04 | -4.340424E-05 | 3.687417E-06 | -1.152816E-07 |
| 55 | 5.369584E-04 | -9.113305E-05 | 6.414481E-06 | -6.540847E-08 | -6.572557E-09 |
| 56 | 3.062206E-04 | -3.554030E-05 | 2.272161E-06 | -7.470942E-08 | 7.360900E-10 |
| 65 | 9.380783E-05 | -1.049085E-05 | 6.902747E-07 | -2.344978E-08 | 2.687890E-10 |
| 66 | 5.638723E-06 | -7.446080E-07 | 5.262876E-08 | -1.942282E-09 | 2.951200E-11 |
| 75 | -1.535677E-05 | 7.455346E-07 | -2.157769E-08 | 3.433010E-10 | -2.325000E-12 |
| 76 | -1.564438E-06 | 5.402243E-08 | -1.133218E-09 | 1.374100E-11 | -7.600000E-14 |

FIG. 21

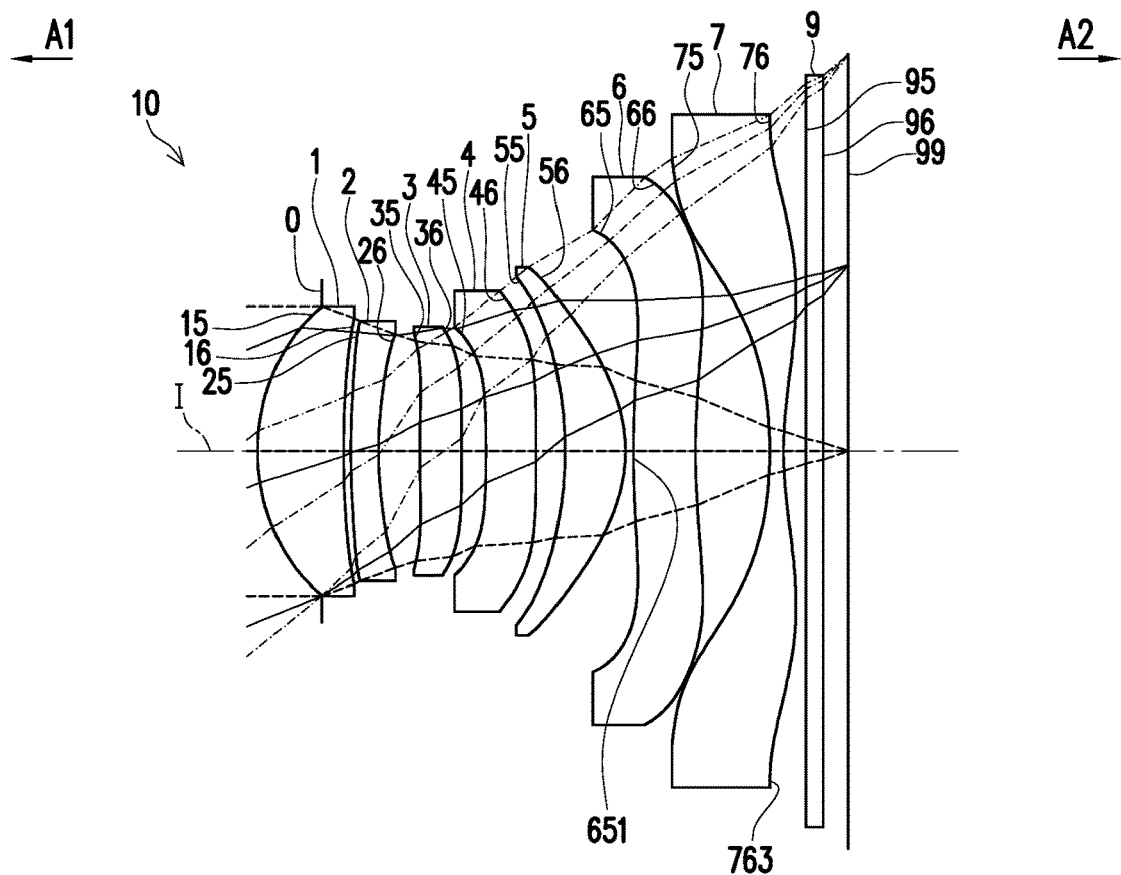
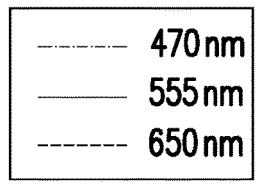
FIG. 22
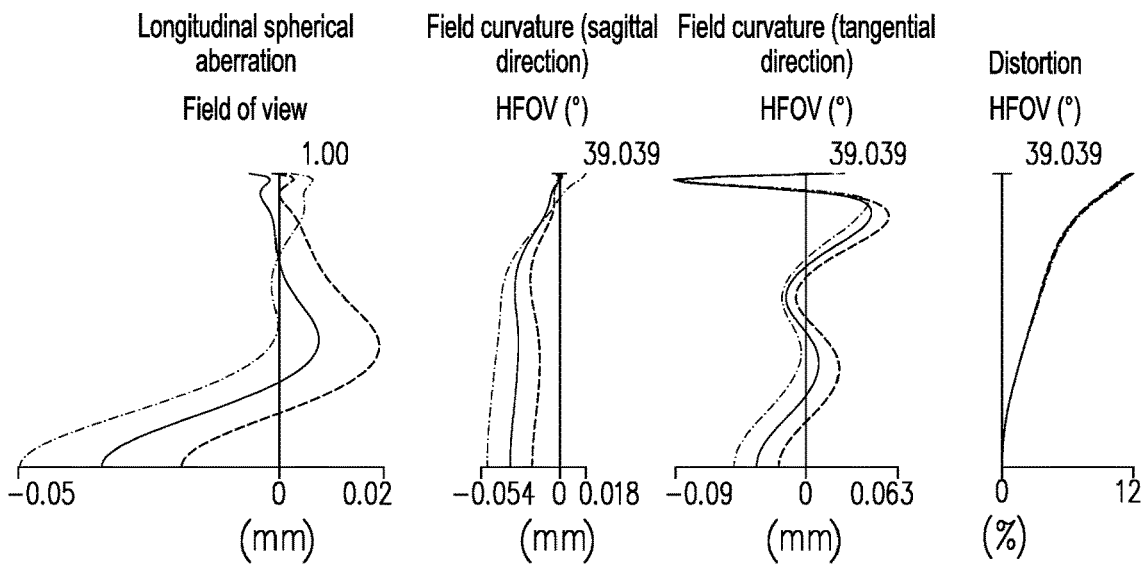
FIG. 23A    FIG. 23B   FIG. 23C    FIG. 23D

| Fifth embodiment | | | | | | |
|---|---|---|---|---|---|---|
| EFL=6.312 mm, HFOV=39.039°, System length=8.571 mm, Fno=1.500, Image height=5.776 mm | | | | | | |
| Device | Surface | Radius of curvature (mm) | Thickness (mm) | Refractive index | Abbe number | Focal length (mm) |
| Object | | Infinity | Infinity | | | |
| Aperture 0 | | Infinity | -0.927 | | | |
| First lens element 1 | Object-side surface 15 | 2.982 | 1.246 | 1.545 | 55.987 | 6.748 |
| | Image-side surface 16 | 13.299 | 0.103 | | | |
| Second lens element 2 | Object-side surface 25 | 10.501 | 0.406 | 1.661 | 20.373 | -20.914 |
| | Image-side surface 26 | 5.899 | 0.599 | | | |
| Third lens element 3 | Object-side surface 35 | 20.146 | 0.608 | 1.545 | 55.987 | 36.662 |
| | Image-side surface 36 | -3376.422 | 0.355 | | | |
| Fourth lens element 4 | Object-side surface 45 | -35.395 | 0.724 | 1.671 | 19.480 | -41.841 |
| | Image-side surface 46 | 143.568 | 0.420 | | | |
| Fifth lens element 5 | Object-side surface 55 | -6.080 | 0.878 | 1.535 | 55.690 | 5.930 |
| | Image-side surface 56 | -2.195 | 0.118 | | | |
| Sixth lens element 6 | Object-side surface 65 | 21.227 | 0.903 | 1.671 | 19.480 | -43.770 |
| | Image-side surface 66 | 12.159 | 1.080 | | | |
| Seventh lens element 7 | Object-side surface 75 | -6.346 | 0.200 | 1.535 | 55.690 | -5.369 |
| | Image-side surface 76 | 5.343 | 0.328 | | | |
| Filter 9 | Object-side surface 95 | Infinity | 0.251 | 1.563 | 51.300 | |
| | Image-side surface 96 | Infinity | 0.352 | | | |
| | Image plane 99 | Infinity | | | | |

FIG. 24

| Surface | K | $a_4$ | $a_6$ | $a_8$ | $a_{10}$ |
|---|---|---|---|---|---|
| 15 | 5.642736E-01 | -2.401590E-03 | 1.668196E-03 | -2.701264E-03 | 2.482158E-03 |
| 16 | 1.192697E+01 | -5.361412E-03 | 2.520443E-04 | 3.214260E-03 | -2.777553E-03 |
| 25 | 1.196624E+01 | -1.620837E-02 | 5.510608E-03 | -2.673992E-03 | 2.997713E-03 |
| 26 | 3.100653E+00 | -1.252774E-02 | 6.791292E-03 | -1.019604E-02 | 1.387966E-02 |
| 35 | -2.705402E+01 | -1.358775E-02 | -3.059011E-03 | 7.235738E-03 | -1.253617E-02 |
| 36 | 2.701480E-02 | -1.883112E-02 | -1.702952E-03 | 1.427556E-03 | -3.868732E-03 |
| 45 | 1.706687E+02 | -3.374142E-02 | 1.124208E-02 | -1.530534E-02 | 1.004473E-02 |
| 46 | 1.147198E+01 | -2.427594E-02 | 1.123699E-02 | -8.430455E-03 | 3.680452E-03 |
| 55 | 1.809096E+00 | -1.140143E-02 | 8.691837E-03 | -9.946929E-04 | -1.211204E-03 |
| 56 | -8.750430E-01 | 1.637616E-02 | -8.167764E-03 | 4.258031E-03 | -1.463441E-03 |
| 65 | 2.411470E+01 | 8.401284E-03 | -6.561795E-03 | 2.109374E-03 | -5.319830E-04 |
| 66 | 4.366025E+00 | -2.644163E-03 | -4.441896E-04 | 4.308355E-05 | -2.109420E-05 |
| 75 | -4.989236E+01 | -3.040652E-02 | 7.334957E-03 | -1.451745E-03 | 1.917891E-04 |
| 76 | -1.500057E-01 | -1.979345E-02 | 2.599693E-03 | -3.253795E-04 | 2.832455E-05 |
| Surface | $a_{12}$ | $a_{14}$ | $a_{16}$ | $a_{18}$ | $a_{20}$ |
| 15 | -1.431033E-03 | 5.070640E-04 | -1.075608E-04 | 1.251726E-05 | -6.174699E-07 |
| 16 | 1.266538E-03 | -3.298949E-04 | 4.294481E-05 | -1.187867E-06 | -1.783673E-07 |
| 25 | -2.274317E-03 | 9.943966E-04 | -2.522760E-04 | 3.514973E-05 | -2.089577E-06 |
| 26 | -1.138963E-02 | 5.678451E-03 | -1.682024E-03 | 2.722993E-04 | -1.834638E-05 |
| 35 | 1.138951E-02 | -6.120994E-03 | 1.951271E-03 | -3.397222E-04 | 2.496784E-05 |
| 36 | 3.348362E-03 | -1.537463E-03 | 4.095800E-04 | -5.886015E-05 | 3.447099E-06 |
| 45 | -4.757063E-03 | 1.583993E-03 | -3.257847E-04 | 3.567744E-05 | -1.612498E-06 |
| 46 | -1.171088E-03 | 2.772623E-04 | -4.323004E-05 | 3.704535E-06 | -1.244107E-07 |
| 55 | 5.372701E-04 | -9.126085E-05 | 6.394022E-06 | -6.707180E-08 | -6.907421E-09 |
| 56 | 3.044334E-04 | -3.582590E-05 | 2.252283E-06 | -7.381307E-08 | 1.255719E-09 |
| 65 | 9.331048E-05 | -1.053997E-05 | 6.972226E-07 | -2.252144E-08 | 1.937440E-10 |
| 66 | 5.654871E-06 | -7.426057E-07 | 5.272303E-08 | -1.942730E-09 | 2.887300E-11 |
| 75 | -1.535825E-05 | 7.455602E-07 | -2.157709E-08 | 3.432710E-10 | -2.309000E-12 |
| 76 | -1.565778E-06 | 5.399392E-08 | -1.134084E-09 | 1.369500E-11 | -7.900000E-14 |

FIG. 25

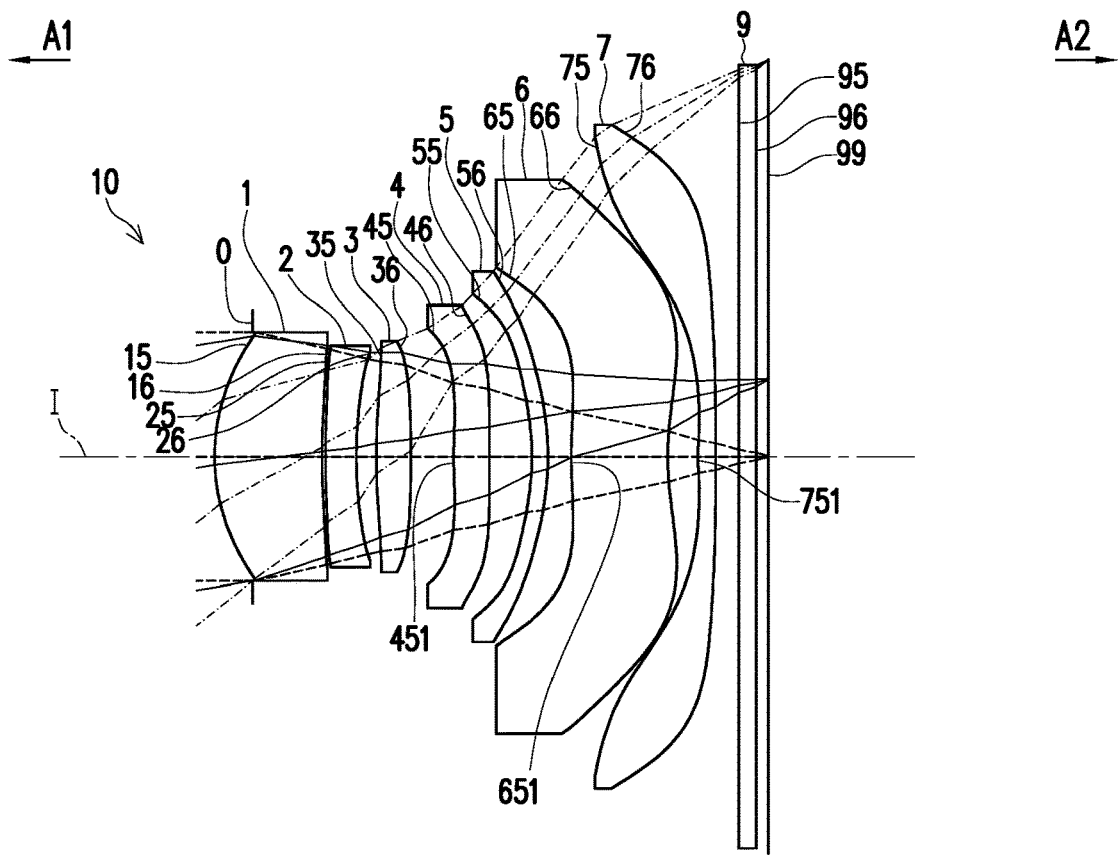
FIG. 26
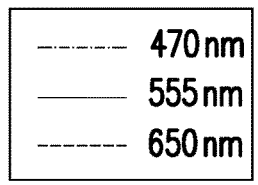
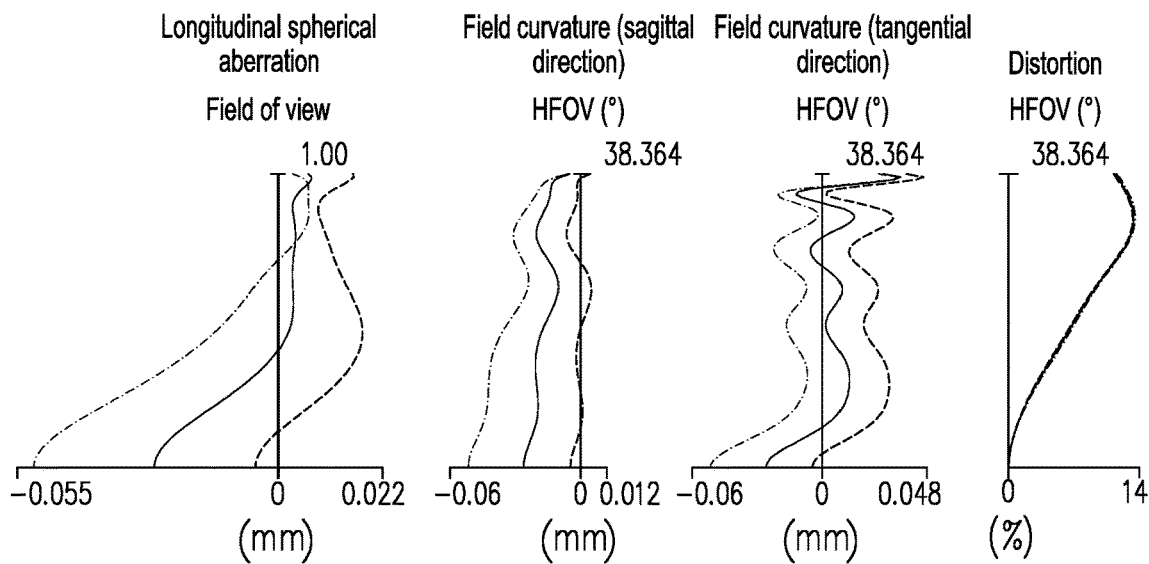
FIG. 27A   FIG. 27B   FIG. 27C   FIG. 27D

| Sixth embodiment | | | | | | |
| --- | --- | --- | --- | --- | --- | --- |
| EFL=6.367 mm, HFOV=38.364°, System length=7.869 mm, | | | | | | |
| Fno=1.800, Image height=5.650 mm | | | | | | |
| Device | Surface | Radius of curvature (mm) | Thickness (mm) | Refractive index | Abbe number | Focal length (mm) |
| Object | | Infinity | Infinity | | | |
| Aperture 0 | | Infinity | -0.542 | | | |
| First lens element 1 | Object-side surface 15 | 2.830 | 1.522 | 1.545 | 55.987 | 6.681 |
| | Image-side surface 16 | 10.214 | 0.050 | | | |
| Second lens element 2 | Object-side surface 25 | 12.959 | 0.439 | 1.661 | 20.373 | -18.768 |
| | Image-side surface 26 | 6.282 | 0.284 | | | |
| Third lens element 3 | Object-side surface 35 | 9.071 | 0.491 | 1.545 | 55.987 | 12.631 |
| | Image-side surface 36 | -28.275 | 0.627 | | | |
| Fourth lens element 4 | Object-side surface 45 | 65.349 | 0.490 | 1.671 | 19.480 | -268.178 |
| | Image-side surface 46 | 47.917 | 0.608 | | | |
| Fifth lens element 5 | Object-side surface 55 | -3.549 | 0.228 | 1.535 | 55.690 | -70.054 |
| | Image-side surface 56 | -4.007 | 0.324 | | | |
| Sixth lens element 6 | Object-side surface 65 | 7.279 | 1.374 | 1.671 | 19.480 | -16.384 |
| | Image-side surface 66 | 4.061 | 0.451 | | | |
| Seventh lens element 7 | Object-side surface 75 | 269.848 | 0.231 | 1.535 | 55.690 | 2695.982 |
| | Image-side surface 76 | 331.557 | 0.328 | | | |
| Filter 9 | Object-side surface 95 | Infinity | 0.251 | 1.563 | 51.300 | |
| | Image-side surface 96 | Infinity | 0.171 | | | |
| | Image plane 99 | Infinity | | | | |

FIG. 28

| Surface | K | $a_4$ | $a_6$ | $a_8$ | $a_{10}$ |
|---|---|---|---|---|---|
| 15 | 4.284526E-01 | -4.258210E-03 | 1.127858E-03 | -2.781970E-03 | 2.466494E-03 |
| 16 | -1.829549E+01 | -1.163468E-02 | -7.397203E-04 | 3.419249E-03 | -2.667157E-03 |
| 25 | 2.257373E+01 | -1.884195E-02 | 5.765708E-03 | -2.301030E-03 | 3.021930E-03 |
| 26 | 6.584124E+00 | -1.098558E-02 | 7.771412E-03 | -1.016160E-02 | 1.398417E-02 |
| 35 | 2.138534E+01 | -1.298477E-02 | -3.237527E-03 | 7.313413E-03 | -1.268462E-02 |
| 36 | 0.000000E+00 | -1.288366E-02 | -1.239334E-03 | 1.414196E-03 | -3.867086E-03 |
| 45 | 0.000000E+00 | -3.304091E-02 | 1.325027E-02 | -1.501415E-02 | 9.910052E-03 |
| 46 | 0.000000E+00 | -2.792072E-02 | 1.219592E-02 | -8.737641E-03 | 3.688729E-03 |
| 55 | -1.645546E+01 | -1.149469E-02 | 5.770625E-03 | -4.908680E-04 | -1.272253E-03 |
| 56 | 4.052398E-01 | 1.504288E-02 | -6.362356E-03 | 3.872299E-03 | -1.472477E-03 |
| 65 | -1.057367E+02 | -2.070741E-02 | -4.955138E-03 | 2.204916E-03 | -5.373729E-04 |
| 66 | -1.749644E+01 | -1.339748E-02 | -3.701050E-04 | 7.497708E-05 | -2.076296E-05 |
| 75 | 0.000000E+00 | -3.277531E-02 | 7.335420E-03 | -1.450261E-03 | 1.918613E-04 |
| 76 | 4.077138E+03 | -8.132252E-03 | 2.162370E-03 | -3.248802E-04 | 2.839161E-05 |
| Surface | $a_{12}$ | $a_{14}$ | $a_{16}$ | $a_{18}$ | $a_{20}$ |
| 15 | -1.429878E-03 | 5.064958E-04 | -1.078496E-04 | 1.245684E-05 | -5.934404E-07 |
| 16 | 1.292308E-03 | -3.264536E-04 | 4.468906E-05 | -9.821653E-07 | -7.878933E-07 |
| 25 | -2.226338E-03 | 1.001322E-03 | -2.520203E-04 | 3.481945E-05 | -2.544674E-06 |
| 26 | -1.136409E-02 | 5.675591E-03 | -1.684719E-03 | 2.721587E-04 | -1.766294E-05 |
| 35 | 1.153127E-02 | -6.127294E-03 | 1.936673E-03 | -3.412018E-04 | 2.650304E-05 |
| 36 | 3.328469E-03 | -1.545733E-03 | 4.086456E-04 | -5.863972E-05 | 3.455426E-06 |
| 45 | -4.825601E-03 | 1.578086E-03 | -3.220774E-04 | 3.708988E-05 | -1.978887E-06 |
| 46 | -1.169562E-03 | 2.771171E-04 | -4.340359E-05 | 3.721069E-06 | -1.041842E-07 |
| 55 | 5.215944E-04 | -9.149542E-05 | 6.639339E-06 | -2.388674E-08 | -7.285008E-09 |
| 56 | 3.062982E-04 | -3.549256E-05 | 2.279446E-06 | -7.402246E-08 | 8.218180E-10 |
| 65 | 9.019468E-05 | -1.065629E-05 | 7.001629E-07 | -2.049830E-08 | 7.351690E-10 |
| 66 | 5.636352E-06 | -7.441907E-07 | 5.265961E-08 | -1.948719E-09 | 2.945400E-11 |
| 75 | -1.535817E-05 | 7.454964E-07 | -2.157938E-08 | 3.433390E-10 | -2.311000E-12 |
| 76 | -1.569628E-06 | 5.397776E-08 | -1.133177E-09 | 1.380200E-11 | -7.300000E-14 |

FIG. 29

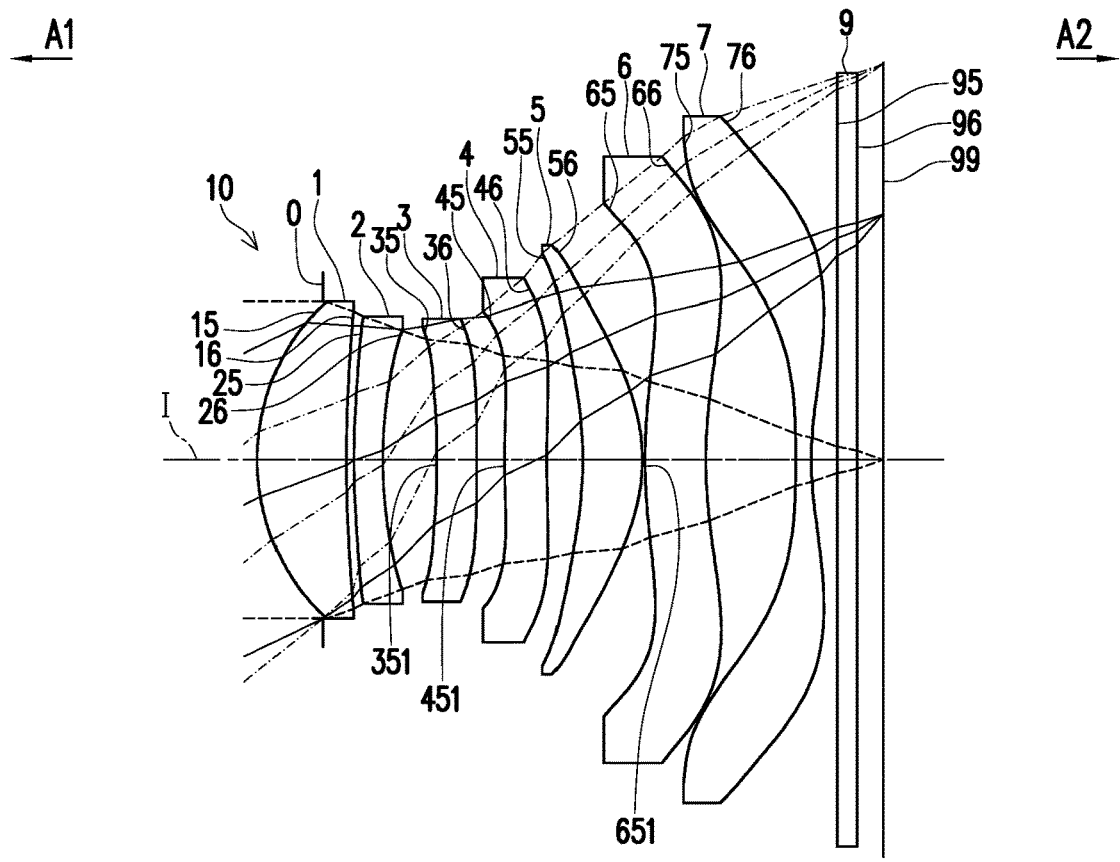
FIG. 30
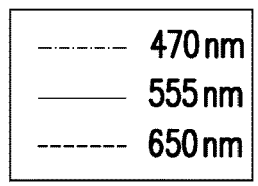
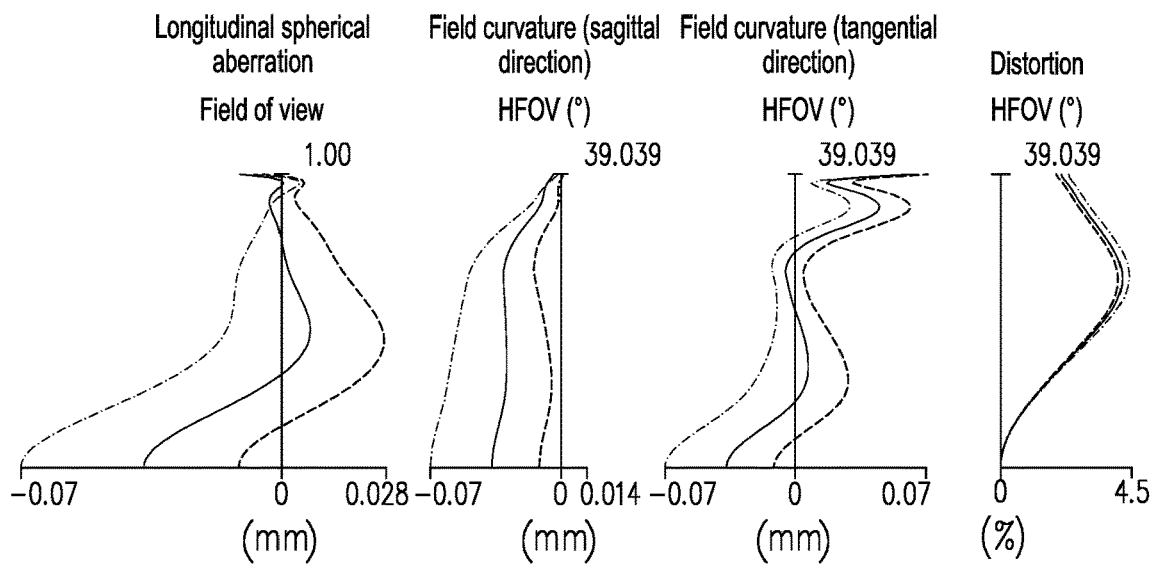
FIG. 31A    FIG. 31B    FIG. 31C    FIG. 31D

| Seventh embodiment | | | | | | |
|---|---|---|---|---|---|---|
| EFL=6.050 mm, HFOV=39.039°, System length=7.971 mm, Fno=1.500, Image height=5.055 mm | | | | | | |
| Device | Surface | Radius of curvature (mm) | Thickness (mm) | Refractive index | Abbe number | Focal length (mm) |
| Object | | Infinity | Infinity | | | |
| Aperture 0 | | Infinity | -0.830 | | | |
| First lens element 1 | Object-side surface 15 | 2.835 | 1.130 | 1.545 | 55.987 | 6.225 |
| | Image-side surface 16 | 14.309 | 0.097 | | | |
| Second lens element 2 | Object-side surface 25 | 9.101 | 0.369 | 1.661 | 20.373 | -21.026 |
| | Image-side surface 26 | 5.430 | 0.661 | | | |
| Third lens element 3 | Object-side surface 35 | -777.271 | 0.537 | 1.545 | 55.987 | -3440.109 |
| | Image-side surface 36 | -1325.839 | 0.359 | | | |
| Fourth lens element 4 | Object-side surface 45 | 12.497 | 0.537 | 1.671 | 19.480 | 159.106 |
| | Image-side surface 46 | 13.890 | 0.452 | | | |
| Fifth lens element 5 | Object-side surface 55 | -5.177 | 0.761 | 1.535 | 55.690 | 7.408 |
| | Image-side surface 56 | -2.365 | 0.035 | | | |
| Sixth lens element 6 | Object-side surface 65 | 7.505 | 0.775 | 1.671 | 19.480 | -58.571 |
| | Image-side surface 66 | 6.048 | 1.147 | | | |
| Seventh lens element 7 | Object-side surface 75 | -19.054 | 0.200 | 1.535 | 55.690 | -6.340 |
| | Image-side surface 76 | 4.161 | 0.328 | | | |
| Filter 9 | Object-side surface 95 | Infinity | 0.251 | 1.563 | 51.300 | |
| | Image-side surface 96 | Infinity | 0.332 | | | |
| | Image plane 99 | Infinity | | | | |

FIG. 32

| Surface | K | $a_4$ | $a_6$ | $a_8$ | $a_{10}$ |
|---|---|---|---|---|---|
| 15 | 4.437921E-01 | -2.622173E-03 | 1.759702E-03 | -2.733522E-03 | 2.483833E-03 |
| 16 | -6.231853E+00 | -7.404080E-03 | 5.741572E-04 | 3.101315E-03 | -2.771704E-03 |
| 25 | 6.854661E+00 | -1.808830E-02 | 5.443783E-03 | -2.660013E-03 | 2.989913E-03 |
| 26 | 3.485870E+00 | -1.156557E-02 | 6.267527E-03 | -1.023966E-02 | 1.389652E-02 |
| 35 | 0.000000E+00 | -1.328779E-02 | -2.721000E-03 | 7.043046E-03 | -1.254365E-02 |
| 36 | 0.000000E+00 | -1.862325E-02 | 9.784149E-04 | 1.301811E-03 | -3.890716E-03 |
| 45 | 0.000000E+00 | -3.369686E-02 | 1.302254E-02 | -1.491254E-02 | 1.005533E-02 |
| 46 | 0.000000E+00 | -2.389958E-02 | 1.141199E-02 | -8.491112E-03 | 3.700341E-03 |
| 55 | -8.272920E+00 | -7.294754E-03 | 8.510127E-03 | -9.836190E-04 | -1.216883E-03 |
| 56 | -9.852114E-01 | 1.597263E-02 | -6.422110E-03 | 3.973280E-03 | -1.468977E-03 |
| 65 | -2.973858E+01 | 6.606618E-03 | -6.442895E-03 | 2.083465E-03 | -5.319592E-04 |
| 66 | 8.487467E-01 | -9.241093E-03 | -1.699398E-04 | 4.215672E-05 | -2.169069E-05 |
| 75 | 0.000000E+00 | -3.293335E-02 | 7.455679E-03 | -1.448630E-03 | 1.918089E-04 |
| 76 | -1.522340E+01 | -1.463942E-02 | 2.177398E-03 | -3.235942E-04 | 2.868035E-05 |
| Surface | $a_{12}$ | $a_{14}$ | $a_{16}$ | $a_{18}$ | $a_{20}$ |
| 15 | -1.431111E-03 | 5.070641E-04 | -1.075335E-04 | 1.251888E-05 | -6.240764E-07 |
| 16 | 1.268638E-03 | -3.300326E-04 | 4.272671E-05 | -1.281716E-06 | -1.515316E-07 |
| 25 | -2.271026E-03 | 9.946099E-04 | -2.525981E-04 | 3.513230E-05 | -2.064890E-06 |
| 26 | -1.138115E-02 | 5.674037E-03 | -1.683212E-03 | 2.729497E-04 | -1.840312E-05 |
| 35 | 1.140756E-02 | -6.119751E-03 | 1.948587E-03 | -3.406585E-04 | 2.536102E-05 |
| 36 | 3.349305E-03 | -1.539950E-03 | 4.083882E-04 | -5.894299E-05 | 3.613783E-06 |
| 45 | -4.801650E-03 | 1.575505E-03 | -3.242717E-04 | 3.662022E-05 | -1.749819E-06 |
| 46 | -1.166167E-03 | 2.771036E-04 | -4.347876E-05 | 3.667723E-06 | -1.151952E-07 |
| 55 | 5.363137E-04 | -9.107274E-05 | 6.430645E-06 | -6.640326E-08 | -7.957898E-09 |
| 56 | 3.061230E-04 | -3.562181E-05 | 2.259166E-06 | -7.502739E-08 | 1.094589E-09 |
| 65 | 9.367339E-05 | -1.050609E-05 | 6.904567E-07 | -2.328514E-08 | 2.954200E-10 |
| 66 | 5.636840E-06 | -7.429303E-07 | 5.272428E-08 | -1.940218E-09 | 2.940900E-11 |
| 75 | -1.536189E-05 | 7.453362E-07 | -2.158252E-08 | 3.433710E-10 | -2.305000E-12 |
| 76 | -1.559118E-06 | 5.416612E-08 | -1.124662E-09 | 1.367500E-11 | -1.490000E-13 |

FIG. 33

| Eighth embodiment ||||||
|---|---|---|---|---|---|---|
| EFL=5.977 mm, HFOV=39.039°, System length=8.048 mm, Fno=1.500, Image height=5.082 mm ||||||
| Device | Surface | Radius of curvature (mm) | Thickness (mm) | Refractive index | Abbe number | Focal length (mm) |
| Object | | Infinity | Infinity | | | |
| Aperture 0 | | Infinity | −0.775 | | | |
| First lens element 1 | Object-side surface 15 | 2.926 | 1.147 | 1.545 | 55.987 | 7.629 |
| | Image-side surface 16 | 8.464 | 0.108 | | | |
| Second lens element 2 | Object-side surface 25 | 8.733 | 0.482 | 1.661 | 20.373 | 35162535.950 |
| | Image-side surface 26 | 8.540 | 0.557 | | | |
| Third lens element 3 | Object-side surface 35 | 15.609 | 0.457 | 1.545 | 55.987 | 26.755 |
| | Image-side surface 36 | −227.354 | 0.298 | | | |
| Fourth lens element 4 | Object-side surface 45 | −29.591 | 0.607 | 1.671 | 19.480 | −37.464 |
| | Image-side surface 46 | 179.974 | 0.355 | | | |
| Fifth lens element 5 | Object-side surface 55 | −4.802 | 0.856 | 1.535 | 55.690 | 7.323 |
| | Image-side surface 56 | −2.297 | 0.035 | | | |
| Sixth lens element 6 | Object-side surface 65 | 38.313 | 1.234 | 1.671 | 19.480 | −66.161 |
| | Image-side surface 66 | 20.388 | 0.895 | | | |
| Seventh lens element 7 | Object-side surface 75 | −3.864 | 0.200 | 1.535 | 55.690 | −4.882 |
| | Image-side surface 76 | 8.306 | 0.328 | | | |
| Filter 9 | Object-side surface 95 | Infinity | 0.251 | 1.563 | 51.300 | |
| | Image-side surface 96 | Infinity | 0.239 | | | |
| | Image plane 99 | Infinity | | | | |

FIG. 36

| Surface | K | $a_4$ | $a_6$ | $a_8$ | $a_{10}$ |
|---|---|---|---|---|---|
| 15 | 4.377177E-01 | -2.920462E-03 | 1.778003E-03 | -2.746861E-03 | 2.474548E-03 |
| 16 | -1.705062E+00 | -7.849748E-03 | -8.796393E-04 | 3.779030E-03 | -2.937797E-03 |
| 25 | 3.203533E+00 | -1.860870E-02 | 4.682181E-03 | -2.623324E-03 | 2.994004E-03 |
| 26 | 1.541178E+00 | -1.356150E-02 | 6.987338E-03 | -1.058997E-02 | 1.390268E-02 |
| 35 | 8.778831E+00 | -1.296965E-02 | -3.308277E-03 | 7.203300E-03 | -1.258739E-02 |
| 36 | 1.683729E+04 | -1.915738E-02 | -1.133478E-03 | 1.133331E-03 | -3.928096E-03 |
| 45 | 2.440383E+02 | -3.651084E-02 | 1.201593E-02 | -1.484731E-02 | 1.002519E-02 |
| 46 | 6.401468E+03 | -2.499504E-02 | 1.279759E-02 | -8.478828E-03 | 3.702841E-03 |
| 55 | -3.402617E+00 | -6.333005E-03 | 8.699234E-03 | -9.836816E-04 | -1.208434E-03 |
| 56 | -8.923774E-01 | 1.543882E-02 | -6.996155E-03 | 4.090520E-03 | -1.469637E-03 |
| 65 | -3.481690E+03 | 3.977231E-03 | -6.626183E-03 | 2.038185E-03 | -5.305640E-04 |
| 66 | 9.538195E-01 | -6.542443E-03 | -2.823764E-04 | 2.496655E-05 | -2.192435E-05 |
| 75 | -1.174560E+01 | -3.199394E-02 | 7.429322E-03 | -1.448708E-03 | 1.917632E-04 |
| 76 | 7.352420E-01 | -1.881074E-02 | 2.701971E-03 | -3.250947E-04 | 2.809038E-05 |
| Surface | $a_{12}$ | $a_{14}$ | $a_{16}$ | $a_{18}$ | $a_{20}$ |
| 15 | -1.430194E-03 | 5.072182E-04 | -1.076154E-04 | 1.249524E-05 | -6.198579E-07 |
| 16 | 1.238567E-03 | -3.171824E-04 | 4.461710E-05 | -2.391731E-06 | -2.520190E-08 |
| 25 | -2.271053E-03 | 9.953895E-04 | -2.525934E-04 | 3.500597E-05 | -2.023039E-06 |
| 26 | -1.136761E-02 | 5.679704E-03 | -1.683528E-03 | 2.719230E-04 | -1.829516E-05 |
| 35 | 1.137962E-02 | -6.123277E-03 | 1.950956E-03 | -3.396950E-04 | 2.492579E-05 |
| 36 | 3.333848E-03 | -1.538913E-03 | 4.106176E-04 | -5.844416E-05 | 3.325963E-06 |
| 45 | -4.786216E-03 | 1.583162E-03 | -3.231939E-04 | 3.641751E-05 | -1.889110E-06 |
| 46 | -1.167068E-03 | 2.772268E-04 | -4.336533E-05 | 3.684090E-06 | -1.205891E-07 |
| 55 | 5.372944E-04 | -9.113446E-05 | 6.401097E-06 | -6.716448E-08 | -6.753941E-09 |
| 56 | 3.053784E-04 | -3.568158E-05 | 2.267394E-06 | -7.311240E-08 | 1.694538E-09 |
| 65 | 9.349858E-05 | -1.061235E-05 | 6.784165E-07 | -2.386446E-08 | 2.650310E-10 |
| 66 | 5.684871E-06 | -7.405606E-07 | 5.273042E-08 | -1.939971E-09 | 2.962300E-11 |
| 75 | -1.536665E-05 | 7.451354E-07 | -2.158775E-08 | 3.439010E-10 | -2.223000E-12 |
| 76 | -1.577448E-06 | 5.421112E-08 | -1.130768E-09 | 1.384300E-11 | -8.400000E-14 |

FIG. 37

| Condition | First embodiment | Second embodiment | Third embodiment | Fourth embodiment |
|---|---|---|---|---|
| ALT | 4.926 | 5.136 | 5.207 | 5.454 |
| AAG | 2.241 | 2.502 | 2.621 | 2.361 |
| BFL | 0.750 | 0.917 | 0.648 | 0.862 |
| TL | 7.167 | 7.637 | 7.828 | 7.816 |
| TTL | 7.917 | 8.554 | 8.477 | 8.677 |
| Tavg2345 | 0.630 | 0.633 | 0.611 | 0.632 |
| Tstd2345 | 0.166 | 0.211 | 0.061 | 0.128 |
| (D11t31+ImgH)/Fno | 4.101 | 5.281 | 5.428 | 5.541 |
| V4+V5+V6+V7 | 168.393 | 168.340 | 168.340 | 150.341 |
| Tavg2345/Tstd2345 | 3.800 | 3.000 | 10.000 | 4.946 |
| ALT*Fno/AAG | 4.396 | 3.080 | 2.980 | 3.465 |
| (G12+D41t61)/T1 | 1.800 | 1.425 | 1.394 | 1.293 |
| (G23+D41t61)/(T2+T3) | 2.609 | 2.246 | 1.986 | 1.885 |
| (D41t61+BFL)/(G67+T7) | 2.400 | 1.904 | 1.529 | 1.614 |
| TL/D61t72 | 3.241 | 3.251 | 3.056 | 3.074 |
| (EFL+ImgH)/Fno | 6.301 | 7.938 | 8.022 | 8.314 |
| V5+V6 | 93.223 | 69.100 | 69.100 | 75.170 |
| V6+V7 | 93.223 | 69.100 | 69.100 | 75.170 |
| (G23+G45+G56)/G34 | 3.200 | 2.111 | 2.485 | 2.098 |
| D41t61/(G12+T2) | 4.148 | 3.079 | 2.599 | 2.769 |
| TTL/(T1+D61t72) | 2.355 | 2.258 | 2.150 | 2.153 |
| (TTL+ImgH)/Fno | 7.000 | 9.346 | 9.395 | 9.664 |
| (T3+D41t61+T6)/(T1+G12) | 3.000 | 2.091 | 2.181 | 2.040 |
| (T4+T6+T7)/T2 | 4.439 | 3.623 | 3.812 | 3.934 |
| (G23+T3)/G34 | 3.400 | 2.562 | 2.883 | 2.758 |
| (D41t61+T6)/(T2+G34) | 4.200 | 3.303 | 3.071 | 3.105 |
| (T3+T4+T5+T6+T7)/T1 | 2.900 | 2.246 | 2.390 | 2.325 |

FIG. 38

| Condition | Fifth embodiment | Sixth embodiment | Seventh embodiment | Eighth embodiment |
|---|---|---|---|---|
| ALT | 4.965 | 4.775 | 4.310 | 4.983 |
| AAG | 2.675 | 2.344 | 2.750 | 2.248 |
| BFL | 0.931 | 0.750 | 0.911 | 0.818 |
| TL | 7.640 | 7.119 | 7.060 | 7.230 |
| TTL | 8.571 | 7.869 | 7.971 | 8.048 |
| Tavg2345 | 0.654 | 0.412 | 0.551 | 0.600 |
| Tstd2345 | 0.172 | 0.108 | 0.140 | 0.158 |
| (D11t31+ImgH)/Fno | 5.420 | 4.414 | 4.874 | 4.918 |
| V4+V5+V6+V7 | 150.341 | 150.341 | 150.341 | 150.341 |
| Tavg2345/Tstd2345 | 3.800 | 3.800 | 3.949 | 3.800 |
| ALT*Fno/AAG | 2.785 | 3.666 | 2.351 | 3.325 |
| (G12+D41t61)/T1 | 1.800 | 1.117 | 1.665 | 1.710 |
| (G23+D41t61)/(T2+T3) | 2.700 | 2.079 | 2.700 | 2.566 |
| (D41t61+BFL)/(G67+T7) | 2.400 | 3.519 | 2.001 | 2.439 |
| TL/D61t72 | 3.500 | 3.463 | 3.326 | 3.105 |
| (EFL+ImgH)/Fno | 8.058 | 6.676 | 7.403 | 7.373 |
| V5+V6 | 75.170 | 75.170 | 75.170 | 75.170 |
| V6+V7 | 75.170 | 75.170 | 75.170 | 75.170 |
| (G23+G45+G56)/G34 | 3.200 | 1.939 | 3.200 | 3.182 |
| D41t61/(G12+T2) | 4.200 | 3.376 | 3.836 | 3.137 |
| TTL/(T1+D61t72) | 2.500 | 2.199 | 2.451 | 2.315 |
| (TTL+ImgH)/Fno | 9.565 | 7.511 | 8.684 | 8.753 |
| (T3+D41t61+T6)/(T1+G12) | 2.706 | 2.236 | 2.525 | 2.822 |
| (T4+T6+T7)/T2 | 4.500 | 4.775 | 4.105 | 4.231 |
| (G23+T3)/G34 | 3.400 | 1.237 | 3.342 | 3.405 |
| (D41t61+T6)/(T2+G34) | 3.996 | 2.836 | 3.522 | 3.958 |
| (T3+T4+T5+T6+T7)/T1 | 2.660 | 1.849 | 2.488 | 2.923 |

FIG. 39

OPTICAL IMAGING LENS

CROSS-REFERENCE TO RELATED APPLICATION

This application claims the priority benefit of China application no. 202111490104.1, filed on Dec. 8, 2021. The entirety of the above-mentioned patent application is hereby incorporated by reference herein and made a part of this specification.

BACKGROUND OF THE INVENTION

Field of the Invention

The invention relates to an optical device, and in particular relates to an optical imaging lens.

Description of Related Art

The specifications of portable electronic apparatuses are changing with each passing day, and their key components: optical imaging lenses are also becoming more diversified. The main lens of portable electronic apparatuses not only requires a larger aperture and to maintain a shorter system length, but also pursues higher pixel count and higher resolution. The high pixel count implies that the image height of the lens needs to be increased, and the pixel requirement is increased by using a larger image sensor to receive imaging rays. However, the design of the large aperture results in the lens receiving more imaging rays, thus making the design more difficult; and the high pixel resolution demands higher resolution of the lens, thus raising the design difficulty with the large aperture design. Therefore, how to add a plurality of lens elements to the limited system length of the lens, while increasing the resolution and increasing the aperture and image height at the same time, is a challenge and issue to be solved.

SUMMARY OF THE INVENTION

The invention provides an optical imaging lens having larger aperture, larger image height, and higher resolution.

The invention provides an optical imaging lens, including a first lens element, a second lens element, a third lens element, a fourth lens element, a fifth lens element, a sixth lens element, and a seventh lens element sequentially arranged along an optical axis from an object side to an image side, wherein each of the first lens element to the seventh lens element includes an object-side surface facing the object side and allowing an imaging ray to pass through and an image-side surface facing the image side and allowing the imaging ray to pass through. The first lens element has positive refracting power, and a periphery region of the image-side surface of the first lens element is concave. The second lens element has negative refracting power. An optical axis region of the image-side surface of the third lens element is convex. An optical axis region of the image-side surface of the fourth lens element is concave. The sixth lens element has negative refracting power. In particular, lens elements of the optical imaging lens are only the seven lens elements described above and satisfies 3.800 mm≤(D11t31+ImgH)/Fno and 3.000≤Tavg2345/Tstd2345, wherein D11t31 is a distance from the object-side surface of the first lens element to the object-side surface of the third lens element on the optical axis, ImgH is an image height of the optical imaging lens, Fno is an f-number of the optical imaging lens, Tavg2345 is an average value of a thickness from the second lens element to the fifth lens element on the optical axis, and Tstd2345 is a standard deviation of the thickness from the second lens element to the fifth lens element on the optical axis.

The invention further provides an optical imaging lens, including a first lens element, a second lens element, a third lens element, a fourth lens element, a fifth lens element, a sixth lens element, and a seventh lens element sequentially arranged along an optical axis from an object side to an image side, wherein each of the first lens element to the seventh lens element includes an object-side surface facing the object side and allowing an imaging ray to pass through and an image-side surface facing the image side and allowing the imaging ray to pass through. The first lens element has positive refracting power, and a periphery region of the image-side surface of the first lens element is concave. An optical axis region of the image-side surface of the fourth lens element is concave. An optical axis region of the object-side surface of the fifth lens element is concave. The sixth lens element has negative refracting power. An optical axis region of the object-side surface of the seventh lens element is concave. In particular, lens elements of the optical imaging lens are only the seven lens elements described above and satisfies 4.000 mm≤(D11t31+ImgH)/Fno and 3.000≤Tavg2345/Tstd2345, wherein D11t31 is a distance from the object-side surface of the first lens element to the object-side surface of the third lens element on the optical axis, ImgH is an image height of the optical imaging lens, Fno is an f-number of the optical imaging lens, Tavg2345 is an average value of a thickness from the second lens element to the fifth lens element on the optical axis, and Tstd2345 is a standard deviation of the thickness from the second lens element to the fifth lens element on the optical axis.

The invention further provides an optical imaging lens, including a first lens element, a second lens element, a third lens element, a fourth lens element, a fifth lens element, a sixth lens element, and a seventh lens element sequentially arranged along an optical axis from an object side to an image side, wherein each of the first lens element to the seventh lens element includes an object-side surface facing the object side and allowing an imaging ray to pass through and an image-side surface facing the image side and allowing the imaging ray to pass through. The first lens element has positive refracting power, and a periphery region of the image-side surface of the first lens element is concave. An optical axis region of the image-side surface of the third lens element is convex. The sixth lens element has negative refracting power. A periphery region of the object-side surface of the seventh lens element is concave and an optical axis region of the image-side surface of the seventh lens element is concave. In particular, lens elements of the optical imaging lens are only the seven lens elements described above and satisfies 4.000 mm≤(D11t31+ImgH)/Fno and V4+V5+V6+V7≤170.000, wherein D11t31 is a distance from the object-side surface of the first lens element to the object-side surface of the third lens element on the optical axis, ImgH is an image height of the optical imaging lens, Fno is an f-number of the optical imaging lens, V4 is an Abbe number of the fourth lens element, V5 is an Abbe number of the fifth lens element, V6 is an Abbe number of the sixth lens element, and V7 is an Abbe number of the seventh lens element.

Based on the above, the beneficial effects of the optical imaging lens of an embodiment of the invention are: by satisfying the conditions of the arrangement design of the concave-convex curved surfaces and the refracting powers of the lens elements, the optical imaging lens has a larger aperture, a larger image height, and an excellent imaging quality.

In order to make the aforementioned features and advantages of the disclosure more comprehensible, embodiments accompanied with Figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 8 shows detailed optical data of the optical imaging lens of the first embodiment of the invention.

FIG. 9 shows aspheric surface parameters of the optical imaging lens of the first embodiment of the invention.

FIG. 10 is a schematic of the optical imaging lens of the second embodiment of the invention.

FIG. 11A to FIG. 11D are diagrams of the longitudinal spherical aberration and various aberrations of the optical imaging lens of the second embodiment.

FIG. 12 shows detailed optical data of the optical imaging lens of the second embodiment of the invention.

FIG. 13 shows aspheric surface parameters of the optical imaging lens of the second embodiment of the invention.

FIG. 16 shows detailed optical data of the optical imaging lens of the third embodiment of the invention.

FIG. 17 shows aspheric surface parameters of the optical imaging lens of the third embodiment of the invention.

FIG. 18 is a schematic of the optical imaging lens of the fourth embodiment of the invention.

FIG. 19A to FIG. 19D are diagrams of the longitudinal spherical aberration and various aberrations of the optical imaging lens of the fourth embodiment.

FIG. 20 shows detailed optical data of the optical imaging lens of the fourth embodiment of the invention.

FIG. 21 shows aspheric surface parameters of the optical imaging lens of the fourth embodiment of the invention.

FIG. 22 is a schematic of the optical imaging lens of the fifth embodiment of the invention.

FIG. 23A to FIG. 23D are diagrams of the longitudinal spherical aberration and various aberrations of the optical imaging lens of the fifth embodiment.

FIG. 24 shows detailed optical data of the optical imaging lens of the fifth embodiment of the invention.

FIG. 25 shows aspheric surface parameters of the optical imaging lens of the fifth embodiment of the invention.

FIG. 26 is a schematic of the optical imaging lens of the sixth embodiment of the invention.

FIG. 27A to FIG. 27D are diagrams of the longitudinal spherical aberration and various aberrations of the optical imaging lens of the sixth embodiment.

FIG. 28 shows detailed optical data of the optical imaging lens of the sixth embodiment of the invention.

FIG. 29 shows aspheric surface parameters of the optical imaging lens of the sixth embodiment of the invention.

FIG. 30 is a schematic of the optical imaging lens of the seventh embodiment of the invention.

FIG. 31A to FIG. 31D are diagrams of the longitudinal spherical aberration and various aberrations of the optical imaging lens of the seventh embodiment.

FIG. 32 shows detailed optical data of the optical imaging lens of the seventh embodiment of the invention.

FIG. 33 shows aspheric surface parameters of the optical imaging lens of the seventh embodiment of the invention.

FIG. 36 shows detailed optical data of the optical imaging lens of the eighth embodiment of the invention.

FIG. 37 shows aspheric surface parameters of the optical imaging lens of the eighth embodiment of the invention.

FIG. 38 shows the numerical values of the relationship formulas of various important parameters of the optical imaging lenses of the first to fourth embodiments of the invention.

FIG. 39 shows the numerical values of the relationship formulas of various important parameters of the optical imaging lenses of the fifth to eighth embodiments of the invention.

DESCRIPTION OF THE EMBODIMENTS

The terms "optical axis region", "periphery region", "concave", and "convex" used in this specification and claims should be interpreted based on the definition listed in the specification by the principle of lexicographer.

Figure 1:
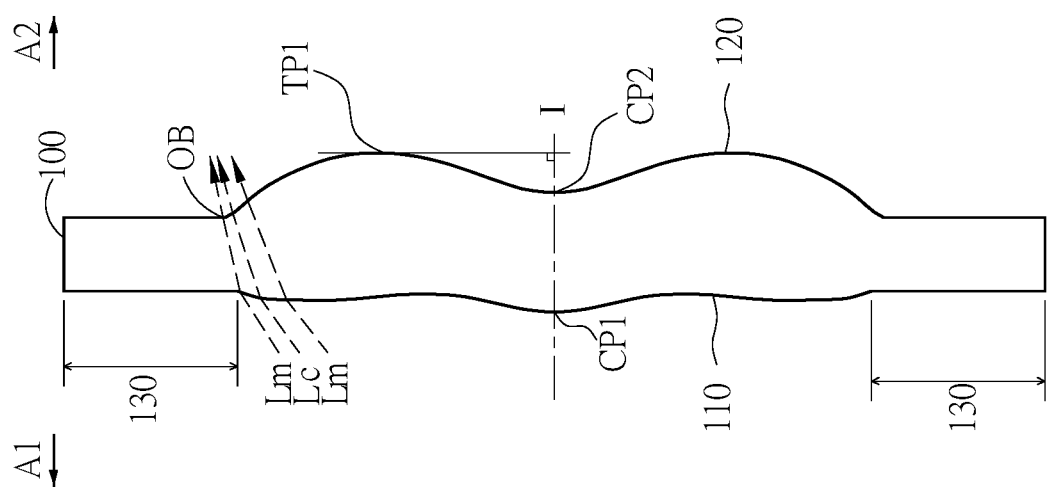
FIG. 1 is a schematic illustrating the surface structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
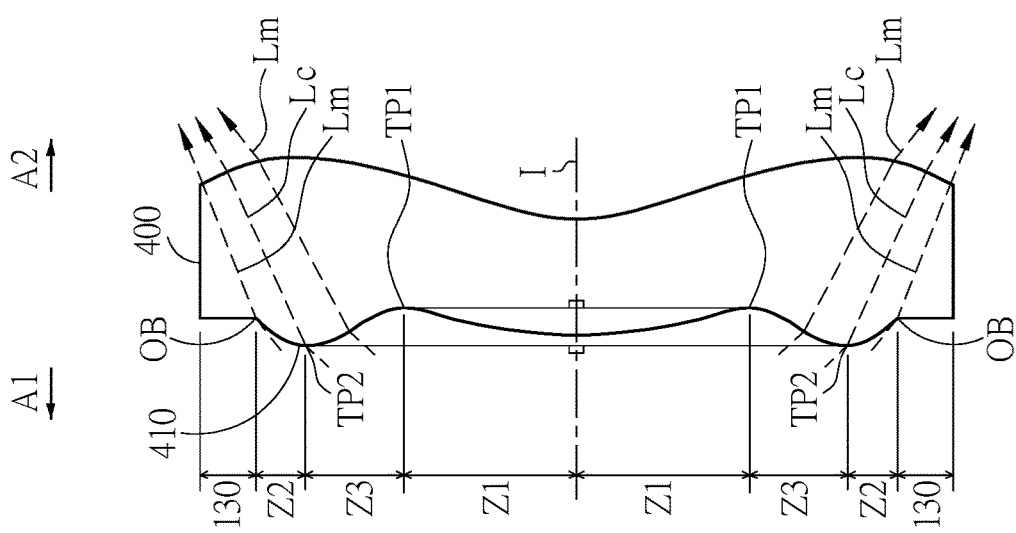
FIG. 4 is a schematic illustrating the surface structure of the lens element of Example 2.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the Nth transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
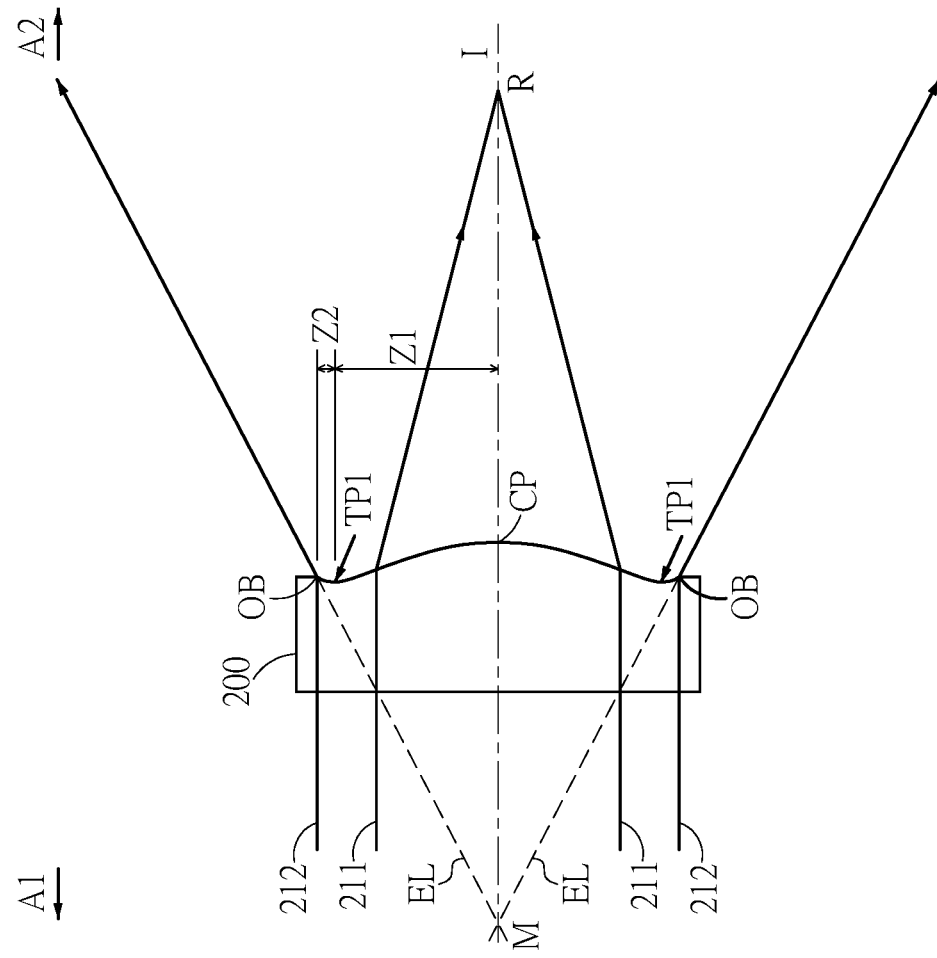
FIG. 2 is a schematic illustrating the surface concave and convex structure of a lens element and the intersection of light rays.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

Figure 5:
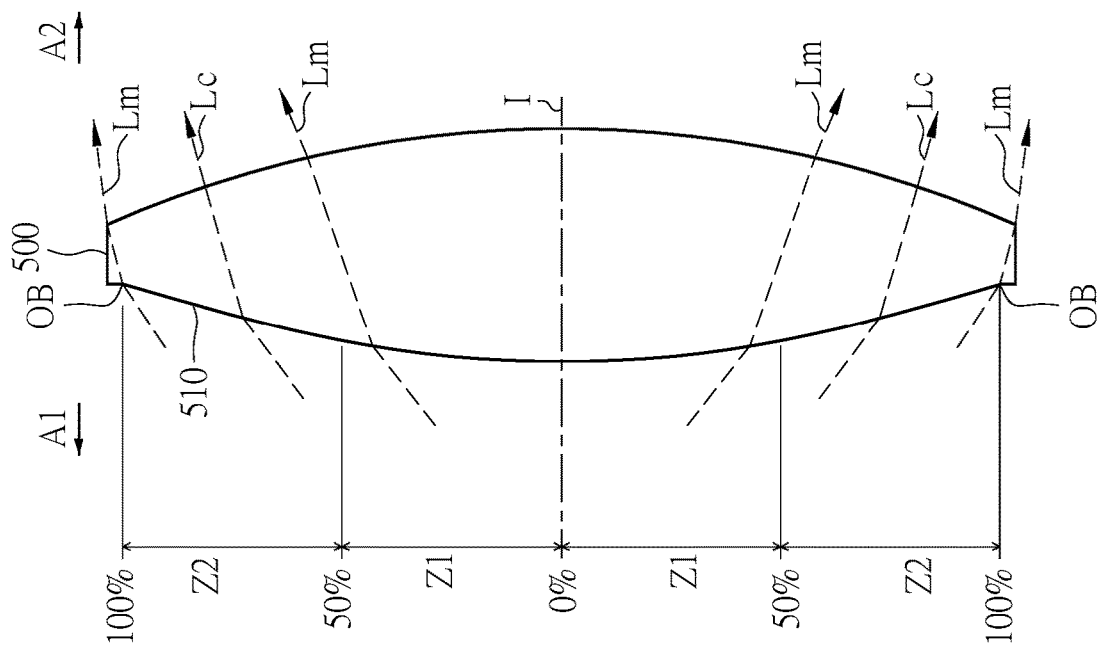
FIG. 5 is a schematic illustrating the surface structure of the lens element of Example 3.
Figure 3:
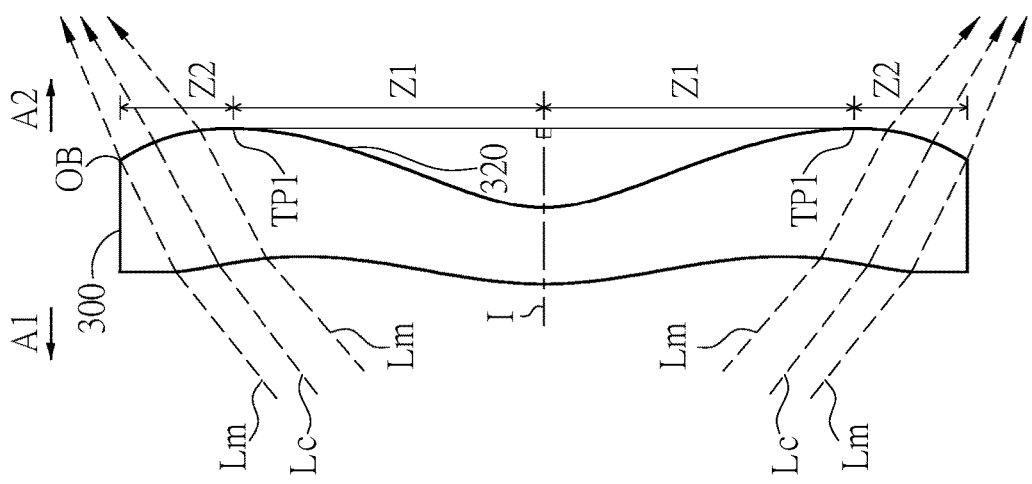
FIG. 3 is a schematic illustrating the surface structure of the lens element of Example 1.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

Figure 6:
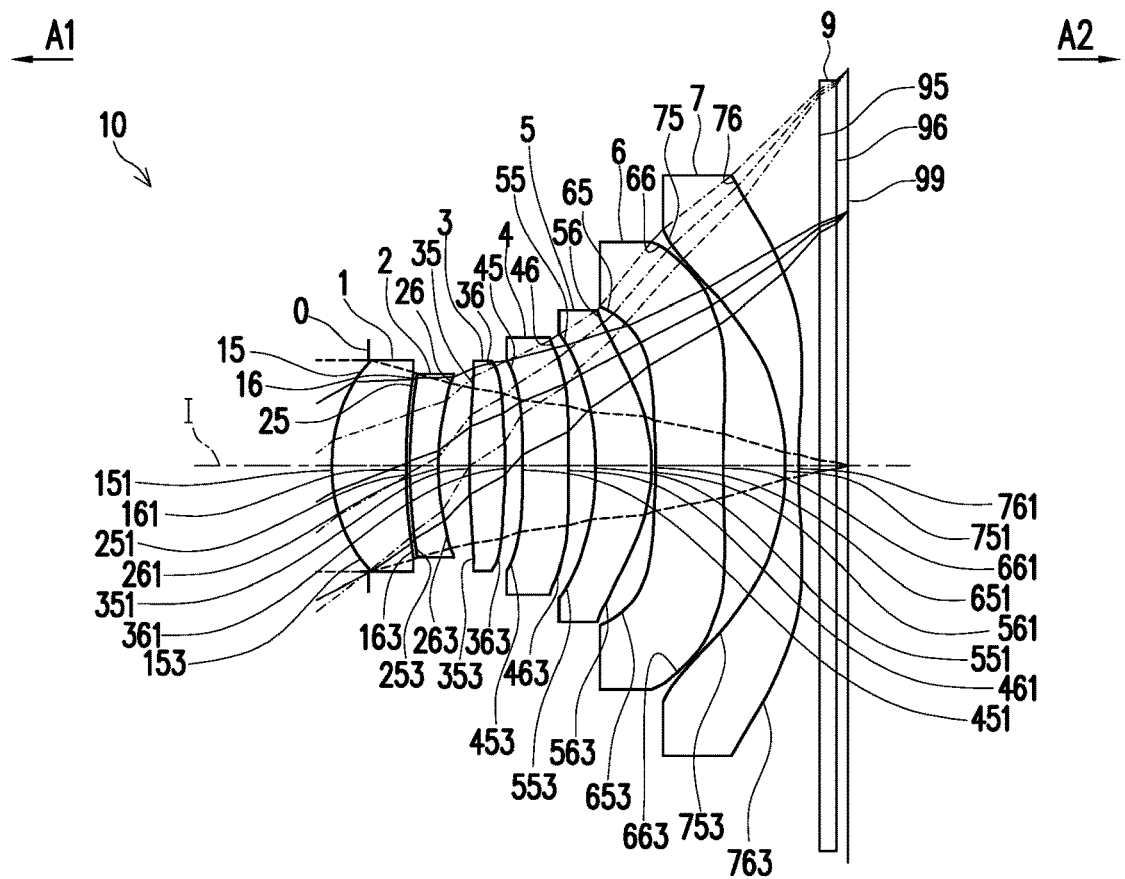
FIG. 6 is a schematic of the optical imaging lens of the first embodiment of the invention.

FIG. 6 is a schematic of the optical imaging lens of the first embodiment of the invention. FIG. 7A to FIG. 7D are diagrams of the longitudinal spherical aberration and various aberrations of the optical imaging lens of the first embodiment. Referring to FIG. 6 first, an optical imaging lens 10 of the first embodiment of the invention sequentially includes an aperture 0, a first lens element 1, a second lens element 2, a third lens element 3, a fourth lens element 4, a fifth lens element 5, a sixth lens element 6, a seventh lens element 7, and a filter 9 along an optical axis I of the optical imaging lens 10 from an object side A1 to an image side A2. When a ray emitted by an object to be photographed enters the optical imaging lens 10 and passes through the aperture 0, the first lens element 1, the second lens element 2, the third lens element 3, the fourth lens element 4, the fifth lens element 5, the sixth lens element 6, the seventh lens element 7, and the filter 9, an image is formed on an image plane 99. The filter 9 is disposed between an image-side surface 76 and the image plane 99 of the seventh lens element 7. It should be added that, the object side A1 is a side facing the object to be photographed and the image side A2 is a side facing the image plane 99. In the present embodiment, the filter 9 is an IR cut filter.

In the present embodiment, the first lens element 1, the second lens element 2, the third lens element 3, the fourth lens element 4, the fifth lens element 5, the sixth lens element 6, the seventh lens element 7, and the filter 9 each have an object-side surface 15, 25, 35, 45, 55, 65, 75, and 95 facing the object side A1 and allowing an imaging ray to pass through and an image-side surface 16, 26, 36, 46, 56, 66, 76, and 96 facing the image side A2 and allowing the imaging ray to pass through. In the present embodiment, the first lens element 1 is placed between the aperture 0 and the second lens element 2.

The first lens element 1 has positive refracting power. An optical axis region 151 of the object-side surface 15 of the first lens element 1 is convex, and a periphery region 153 thereof is convex. An optical axis region 161 of the image-side surface 16 of the first lens element 1 is concave, and a periphery region 163 thereof is concave. In the present embodiment, the object-side surface 15 and the image-side surface 16 of the first lens element 1 are both aspheric surfaces, but the invention is not limited thereto.

The second lens element 2 has negative refracting power. An optical axis region 251 of the object-side surface 25 of the second lens element 2 is convex, and a periphery region 253 thereof is convex. An optical axis region 261 of the image-side surface 26 of the second lens element 2 is concave, and a periphery region 263 thereof is concave. In the present embodiment, the object-side surface 25 and the image-side surface 26 of the second lens element 2 are both aspheric surfaces, but the invention is not limited thereto.

The third lens element 3 has positive refracting power. An optical axis region 351 of the object-side surface 35 of the third lens element 3 is convex, and a periphery region 353 thereof is concave. An optical axis region 361 of the image-side surface 36 of the third lens element 3 is convex, and a periphery region 363 thereof is convex. In the present embodiment, the object-side surface 35 and the image-side surface 36 of the third lens element 3 are both aspheric surfaces, but the invention is not limited thereto.

The fourth lens element 4 has negative refracting power. An optical axis region 451 of the object-side surface 45 of the fourth lens element 4 is concave, and a periphery region 453 thereof is concave. An optical axis region 461 of the image-side surface 46 of the fourth lens element 4 is concave, and a periphery region 463 thereof is convex. In the present embodiment, the object-side surface 45 and the image-side surface 46 of the fourth lens element 4 are both aspheric surfaces, but the invention is not limited thereto.

The fifth lens element 5 has positive refracting power. An optical axis region 551 of the object-side surface 55 of the fifth lens element 5 is concave, and a periphery region 553 thereof is concave. An optical axis region 561 of the image-side surface 56 of the fifth lens element 5 is convex, and a periphery region 563 thereof is convex. In the present embodiment, the object-side surface 55 and the image-side surface 56 of the fifth lens element 5 are both aspheric surfaces, but the invention is not limited thereto.

The sixth lens element 6 has negative refracting power. An optical axis region 651 of the object-side surface 65 of the sixth lens element 6 is concave, and a periphery region 653 thereof is concave. An optical axis region 661 of the image-side surface 66 of the sixth lens element 6 is concave, and a periphery region 663 thereof is convex. In the present embodiment, the object-side surface 65 and the image-side surface 66 of the sixth lens element 6 are both aspheric surfaces, but the invention is not limited thereto.

The seventh lens element 7 has negative refracting power. An optical axis region 751 of the object-side surface 75 of the seventh lens element 7 is concave, and a periphery region 753 thereof is concave. An optical axis region 761 of the image-side surface 76 of the seventh lens element 7 is concave, and a periphery region 763 thereof is convex. In the present embodiment, the object-side surface 75 and the image-side surface 76 of the seventh lens element 7 are both aspheric surfaces, but the invention is not limited thereto.

In the present embodiment, the optical imaging lens 10 has only the above seven lens elements.

Other detailed optical data of the first embodiment is shown in FIG. 8, and the optical imaging lens 10 of the first embodiment has an effective focal length (EFL) of 6.518 millimeters (mm), a half field of view (HFOV) of 37.019°, a system length of 7.917 mm, an f-number (Fno) of 2.000, and an image height of 6.083 mm, wherein the system length refers to the distance from the object-side surface 15 of the first lens element 1 to the image plane 99 on the optical axis I.

Moreover, in the present embodiment, the fourteen surfaces in total of the first lens element 1, the second lens element 2, the third lens element 3, the fourth lens element 4, the fifth lens element 5, the sixth lens element 6, and the seventh lens element 7, i.e., the object-side surfaces 15, 25, 35, 45, 55, 65, 75 and the image-side surfaces 16, 26, 36, 46, 56, 66, 76, are all aspherical surfaces, wherein the object-side surfaces 15, 25, 35, 45, 55, 65, 75 and the image-side surfaces 16, 26, 36, 46, 56, 66, 76 are even aspheric surfaces. These aspheric surfaces are defined according to the following general formula (1):

$$Z(Y) = \frac{Y^2}{R}/(1 + \sqrt{1 - (1+K)\frac{Y^2}{R^2}}) + \sum_{i=1}^{a} a_i \times Y^i \quad (1)$$

wherein:
R: radius of curvature of the lens element surface near the optical axis I;
Z: depth of aspheric surface (vertical distance between the point on the aspheric surface for which the distance from the optical axis I is Y and the cross section tangent to the vertex on the aspheric surface optical axis I);
Y: vertical distance between a point on the aspheric surface curve and the optical axis I;
K: conic constant;
$a_i$: i-th aspheric surface coefficient.

Each of the aspheric coefficients of the object-side surface 15 of the first lens element 1 to the image-side surface 76 of the seventh lens element 9 in general formula (1) is as shown in FIG. 7. In particular, field number 15 in FIG. 9 represents the aspheric coefficient of the object-side surface 15 of the first lens element 1, and the other field fields are defined in a similar manner. In the present embodiment and the following embodiments, the second-order aspheric coefficients $a_2$ are all zero.

Moreover, the relationship between each of the important parameters in the optical imaging lens 10 of the first embodiment is as shown in FIG. 38.

In particular,
T1 is the thickness of the first lens element 1 on the optical axis I;
T2 is the thickness of the second lens element 2 on the optical axis I;
T3 is the thickness of the third lens element 3 on the optical axis I;
T4 is the thickness of the fourth lens element 4 on the optical axis I;
T5 is the thickness of the fifth lens element 5 on the optical axis I;
T6 is the thickness of the sixth lens element 6 on the optical axis I;
T7 is the thickness of the seventh lens element 7 on the optical axis I;
G12 is the distance from the image-side surface 16 of the first lens element 1 to the object-side surface 25 of the second lens element 2 on the optical axis I, that is, the air gap from the first lens element 1 to the second lens element 2 on the optical axis I;
G23 is the distance from the image-side surface 26 of the second lens element 2 to the object-side surface 35 of the third lens element 3 on the optical axis I, that is, the air gap from the second lens element 2 to the third lens element 3 on the optical axis I;
G34 is the distance from the image-side surface 36 of the third lens element 3 to the object-side surface 45 of the fourth lens element 4 on the optical axis I, that is, the air gap from the third lens element 3 to the fourth lens element 4 on the optical axis I;
G45 is the distance from the image-side surface 46 of the fourth lens element 4 to the object-side surface 55 of the fifth lens element 5 on the optical axis I, that is, the air gap from the fourth lens element 4 to the fifth lens element 5 on the optical axis I;
G56 is the distance from the image-side surface 56 of the fifth lens element 5 to the object-side surface 65 of the sixth lens element 6 on the optical axis I, that is, the air gap from the fifth lens element 5 to the sixth lens element 6 on the optical axis I;
G67 is the distance from the image-side surface 66 of the sixth lens element 6 to the object-side surface 75 of the seventh lens element 7 on the optical axis I, that is, the air gap from the sixth lens element 6 to the seventh lens element 7 on the optical axis I;
AAG is the sum of the six air gaps of the first lens element 1 to the seventh lens element 7 on the optical axis I, that is, the sum of the air gaps G12, G23, G34, G45, G56, and G67;
ALT is the sum of the thicknesses of the seven lens elements of the first lens element 1 to the seventh lens element 7 on the optical axis I, that is, the sum of the thicknesses T1, T2, T3, T4, T5, T6, and T7;
TL is the distance from the object-side surface 15 of the first lens element 1 to the image-side surface 76 of the seventh lens element 7 on the optical axis I.
TTL is the distance from the object-side surface 15 of the first lens element 1 to the image plane 99 on the optical axis I;
BFL is the distance from the image-side surface 76 of the seventh lens element 7 to the image plane 99 on the optical axis I;
D11t31 is the distance from the object-side surface 15 of the first lens element 1 to the object-side surface 35 of the third lens element 3 on the optical axis I;
D41t61 is the distance from the object-side surface 45 of the fourth lens element 4 to the object-side surface 65 of the sixth lens element 6 on the optical axis I;
D61t72 is the distance from the object-side surface 65 of the sixth lens element 6 to the image-side surface 76 of the seventh lens element 7 on the optical axis I;

Tavg2345 is the average value of the thickness from the second lens element 2 to the fifth lens element 5 on the optical axis I;

Tstd2345 is the standard deviation of the thickness from the second lens element 2 to the fifth lens element 5 on the optical axis I;

Fno is the f-number of the optical imaging lens 10;

EPD is the entrance pupil diameter of the optical imaging lens 10, which is equal to the effective focal length of the optical imaging lens 10 divided by the Fno;

ImgH is the image height of the optical imaging lens 10; and

EFL is the effective focal length of the optical imaging lens 10.

Moreover, the following are further defined:

V1 is the Abbe number of the first lens element 1, and the Abbe number may also be referred to as the dispersion coefficient;

V2 is the Abbe number of the second lens element 2;

V3 is the Abbe number of the third lens element 3;

V4 is the Abbe number of the fourth lens element 4;

V5 is the Abbe number of the fifth lens element 5;

V6 is the Abbe number of the sixth lens element 6; and

V7 is the Abbe number of the seventh lens element 7.

Figures 7A, 7B, 7C, 7D:
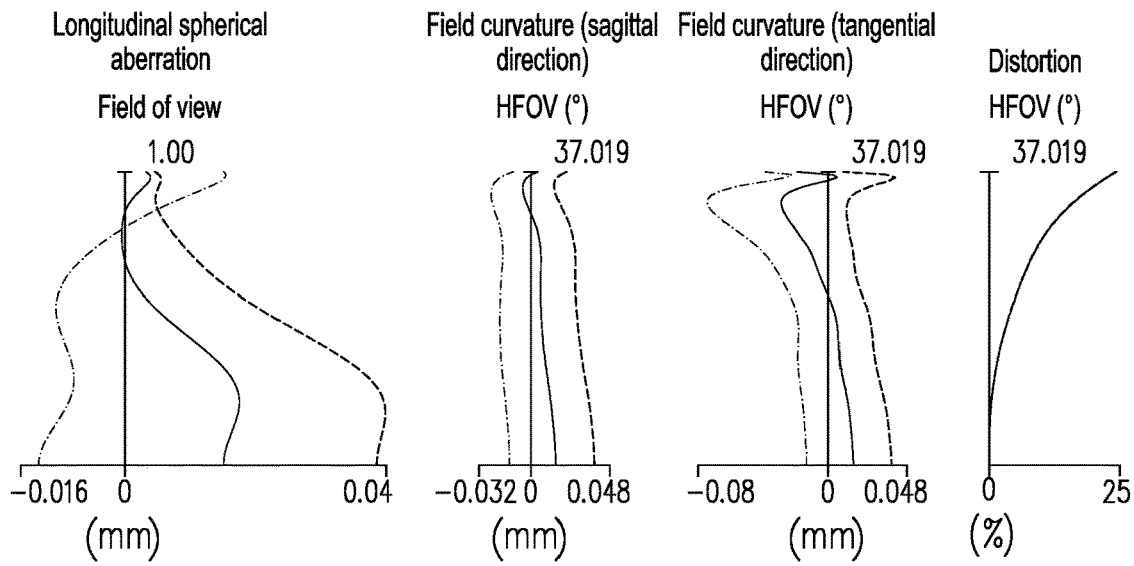
FIG. 7A to FIG. 7D are diagrams of the longitudinal spherical aberration and various aberrations of the optical imaging lens of the first embodiment.

Referring further to FIG. 7A to FIG. 7D, FIG. 7A illustrates the longitudinal spherical aberration on the image plane 99 when the wavelengths of the first embodiment are 470 nm, 555 nm, and 650 nm, FIG. 7B and FIG. 7C respectively illustrate the field curvature aberration in the sagittal direction and the field curvature aberration in the tangential direction on the image plane 99 when the wavelengths of the first embodiment are 470 nm, 555 nm, and 650 nm, and FIG. 7D illustrates the distortion aberration on the image plane 99 when the wavelengths of the first embodiment are 470 nm, 555 nm, and 650 nm. The longitudinal spherical aberration of the first embodiment is shown in FIG. 7A, wherein the curves formed by various wavelengths are all very close and are near the center, indicating the off-axis rays at different heights of each wavelength are all concentrated near the imaging point, and it may be seen from the deflection amplitude of the curve of each wavelength that, the imaging point deviation of the off-axis rays at different heights is controlled within the range of ±0.04 mm, and therefore in the present first embodiment, the spherical aberration of the same wavelength is indeed significantly alleviated. Moreover, the distances between the three representative wavelengths are also relatively close, indicating the imaging positions of different wavelength rays are relatively concentrated, and therefore the chromatic aberration is also significantly alleviated.

In the two field curvature aberration diagrams of FIG. 7B and FIG. 7C, the focal length variations of the three representative wavelengths in the entire field of view is within ±0.08 mm, indicating that the optical system of the first embodiment may effectively eliminate aberrations. The distortion aberration diagram of FIG. 7D shows that the distortion aberration of the present embodiment is maintained within the range of ±25%, indicating that the distortion aberration of the first embodiment meets the imaging quality requirements of the optical system. Accordingly, compared with the existing optical lens, the present first embodiment may still provide good imaging quality under the condition that the system length is shortened to 7.917 mm. Therefore, the first embodiment may have a larger aperture, a larger image height, and excellent imaging quality under the condition of maintaining good optical performance.

FIG. 10 is a schematic of the optical imaging lens of the second embodiment of the invention. FIG. 11A to FIG. 11D are diagrams of the longitudinal spherical aberration and various aberrations of the optical imaging lens of the second embodiment. Referring first to FIG. 10, the second embodiment of the optical imaging lens 10 of the invention is substantially similar to the first embodiment, and the difference between the two is as follows: the optical data, the aspheric coefficients, and the parameters of the lens elements 1, 2, 3, 4, 5, 6, and 7 are slightly different. Moreover, in the present embodiment, the optical axis region 651 of the object-side surface 65 of the sixth lens element 6 is convex. It should be mentioned here that, to clearly show the Figure, in FIG. 10, the reference numerals of the optical axis region and the periphery region similar to the surface shape in the first embodiment are omitted.

The detailed optical data of the optical imaging lens 10 of the second embodiment is shown in FIG. 12, and the optical imaging lens 10 of the second embodiment has an effective focal length of 6.442 mm, a half field of view of 39.039 degrees, a system length of 8.554 mm, an f-number of 1.500, and an image height of 5.465 mm.

FIG. 13 shows each of the aspheric coefficients of the object-side surface 15 of the first lens element 1 to the image-side surface 76 of the seventh lens element 7 of the second embodiment in general formula (1).

Moreover, the relationship between each of the important parameters in the optical imaging lens 10 of the second embodiment is as shown in FIG. 38.

FIG. 11A illustrates the longitudinal spherical aberration of the second embodiment, in which the imaging point deviation of off-axis rays at different heights is controlled within the range of ±0.06 mm. In the two field curvature aberration diagrams of FIG. 11B and FIG. 11C, the focal length variation amount of the three representative wavelengths in the entire field of view is within ±0.09 mm. The distortion aberration diagram of FIG. 11 shows that the distortion aberration of the present embodiment is maintained within the range of ±6%.

It may be known from the above description that the half field of view of the second embodiment is larger than the half field of view of the first embodiment. Therefore, compared with the first embodiment, the second embodiment has a larger angular range for receiving an image. The aperture of the second embodiment is larger than the aperture of the first embodiment. Therefore, compared with the first embodiment, the second embodiment has a larger light influx. Furthermore, the distortion aberration of the second embodiment is smaller than the distortion aberration of the first embodiment.

Figure 14:
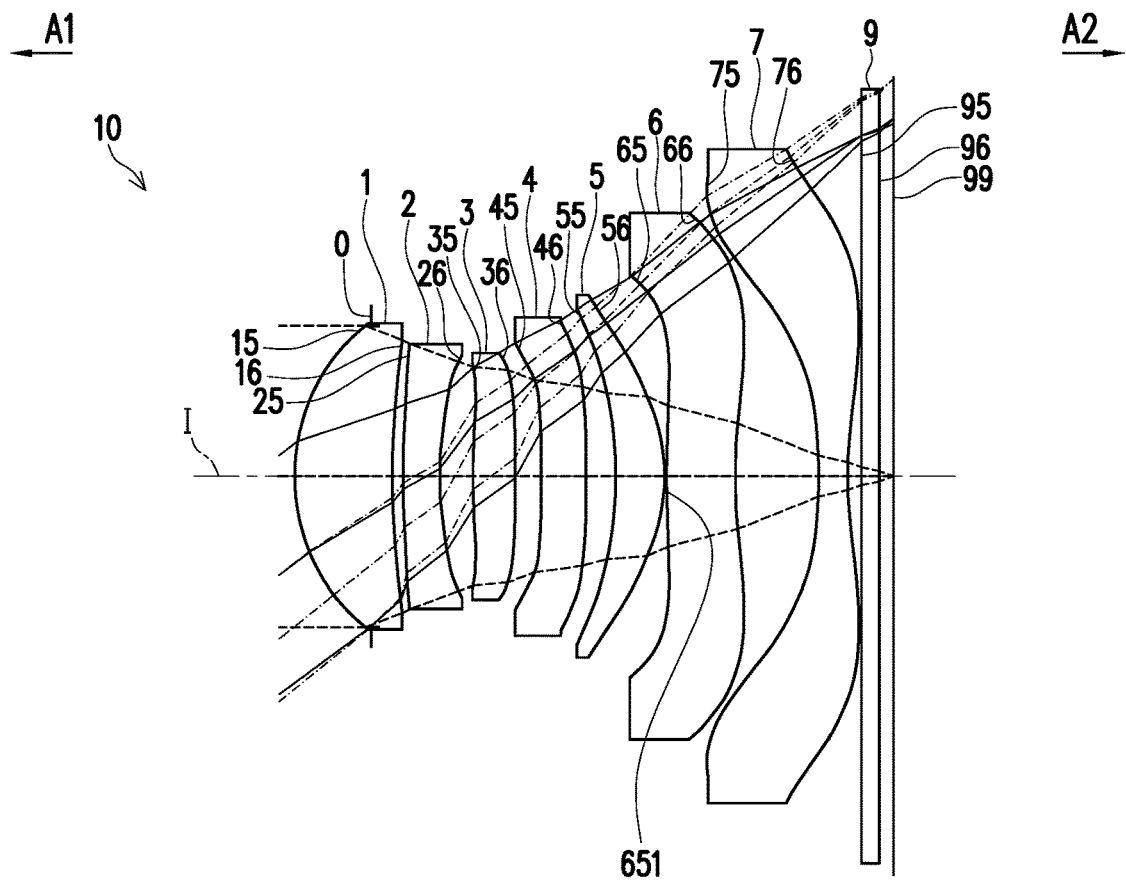
FIG. 14 is a schematic of the optical imaging lens of the third embodiment of the invention.

FIG. 14 is a schematic of the optical imaging lens of the third embodiment of the invention. FIG. 15A to FIG. 15D are diagrams of the longitudinal spherical aberration and various aberrations of the optical imaging lens of the third embodiment. Referring first to FIG. 14, the third embodiment of the optical imaging lens 10 of the invention is substantially similar to the first embodiment, and the difference between the two is as follows: the optical data, the aspheric coefficients, and the parameters of the lens elements 1, 2, 3, 4, 5, 6, and 7 are slightly different. Moreover, in the present embodiment, the optical axis region 651 of the object-side surface 65 of the sixth lens element 6 is convex. It should be mentioned here that, to clearly show the Figure, in FIG. 14, the reference numerals of the optical axis region and the periphery region similar to the surface shape in the first embodiment are omitted.

The detailed optical data of the optical imaging lens 10 of the third embodiment is shown in FIG. 16, and the optical imaging lens 10 of the third embodiment has an effective focal length of 6.418 mm, a half field of view of 39.039 degrees, a system length of 8.477 mm, an f-number of 1.500, and an image height of 5.615 mm.

FIG. 17 shows each of the aspheric coefficients of the object-side surface 15 of the first lens element 1 to the image-side surface 76 of the seventh lens element 7 of the third embodiment in general formula (1).

Moreover, the relationship between each of the important parameters in the optical imaging lens 10 of the third embodiment is as shown in FIG. 38.

Figures 15A, 15B, 15C, 15D:
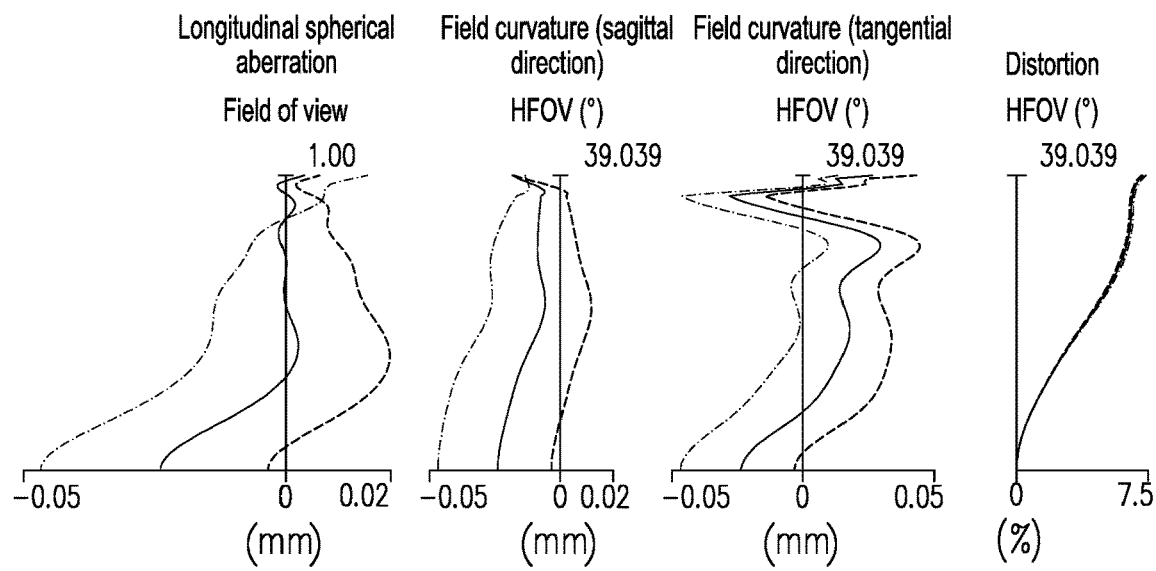
FIG. 15A to FIG. 15D are diagrams of the longitudinal spherical aberration and various aberrations of the optical imaging lens of the third embodiment.

FIG. 15A illustrates the longitudinal spherical aberration of the third embodiment, in which the imaging point deviation of off-axis rays at different heights is controlled within the range of ±0.05 mm. In the two field curvature aberration diagrams of FIG. 15B and FIG. 15C, the focal length variation amount of the three representative wavelengths in the entire field of view is within ±0.05 mm. The distortion aberration diagram of FIG. 15 shows that the distortion aberration of the present embodiment is maintained within the range of ±7.5%.

It may be known from the above description that the half field of view of the third embodiment is larger than the half field of view of the first embodiment. Therefore, compared with the first embodiment, the third embodiment has a larger angular range for receiving an image. The aperture of the third embodiment is larger than the aperture of the first embodiment. Therefore, compared with the first embodiment, the third embodiment has a larger light influx. In addition, the field curvature aberration of the third embodiment is smaller than the field curvature aberration of the first embodiment, and the distortion aberration of the third embodiment is smaller than the distortion aberration of the first embodiment.

FIG. 18 is a schematic of the optical imaging lens of the fourth embodiment of the invention. FIG. 19A to FIG. 19D are diagrams of the longitudinal spherical aberration and various aberrations of the optical imaging lens of the fourth embodiment. Referring first to FIG. 18, the fourth embodiment of the optical imaging lens 10 of the invention is substantially similar to the first embodiment, and the difference between the two is as follows: the optical data, the aspheric coefficients, and the parameters of the lens elements 1, 2, 3, 4, 5, 6, and 7 are slightly different. Moreover, in the present embodiment, the optical axis region 651 of the object-side surface 65 of the sixth lens element 6 is convex. It should be mentioned here that, to clearly show the Figure, in FIG. 18, the reference numerals of the optical axis region and the periphery region similar to the surface shape in the first embodiment are omitted.

The detailed optical data of the optical imaging lens 10 of the fourth embodiment is shown in FIG. 20, and the optical imaging lens 10 of the fourth embodiment has an effective focal length of 6.652 mm, a half field of view of 39.039 degrees, a system length of 8.677 mm, an f-number of 1.500, and an image height of 5.818 mm.

FIG. 21 shows each of the aspheric coefficients of the object-side surface 15 of the first lens element 1 to the image-side surface 76 of the seventh lens element 7 of the fourth embodiment in general formula (1).

Moreover, the relationship between each of the important parameters in the optical imaging lens 10 of the fourth embodiment is as shown in FIG. 38.

FIG. 19A illustrates the longitudinal spherical aberration of the fourth embodiment, in which the imaging point deviation of off-axis rays at different heights is controlled within the range of ±0.08 mm. In the two field curvature aberration diagrams of FIG. 19B and FIG. 19C, the focal length variation amount of the three representative wavelengths in the entire field of view is within ±0.08 mm. The distortion aberration diagram of FIG. 19 shows that the distortion aberration of the present embodiment is maintained within the range of ±6.5%.

It may be known from the above description that the half field of view of the fourth embodiment is larger than the half field of view of the first embodiment. Therefore, compared with the first embodiment, the fourth embodiment has a larger angular range for receiving an image. The aperture of the fourth embodiment is larger than the aperture of the first embodiment. Therefore, compared with the first embodiment, the fourth embodiment has a larger light influx. Furthermore, the distortion aberration of the fourth embodiment is smaller than the distortion aberration of the first embodiment.

FIG. 22 is a schematic of the optical imaging lens of the fifth embodiment of the invention. FIG. 23A to FIG. 23D are diagrams of the longitudinal spherical aberration and various aberrations of the optical imaging lens of the fifth embodiment. Referring first to FIG. 22, the fifth embodiment of the optical imaging lens 10 of the invention is substantially similar to the first embodiment, and the difference between the two is as follows: the optical data, the aspheric coefficients, and the parameters of the lens elements 1, 2, 3, 4, 5, 6, and 7 are slightly different. Moreover, in the present embodiment, the optical axis region 651 of the object-side surface 65 of the sixth lens element 6 is convex. The periphery region 763 of the image side surface 76 of the seventh lens element 7 is concave. It should be mentioned here that, to clearly show the Figure, in FIG. 22, the reference numerals of the optical axis region and the periphery region similar to the surface shape in the first embodiment are omitted.

The detailed optical data of the optical imaging lens 10 of the fifth embodiment is shown in FIG. 24, and the optical imaging lens 10 of the fifth embodiment has an effective focal length of 6.312 mm, a half field of view of 39.039 degrees, a system length of 8.571 mm, an f-number of 1.500, and an image height of 5.776 mm.

FIG. 25 shows each of the aspheric coefficients of the object-side surface 15 of the first lens element 1 to the image-side surface 76 of the seventh lens element 7 of the fifth embodiment in general formula (1).

Moreover, the relationship between each of the important parameters in the optical imaging lens 10 of the fifth embodiment is as shown in FIG. 39.

FIG. 23A illustrates the longitudinal spherical aberration of the fifth embodiment, in which the imaging point deviation of off-axis rays at different heights is controlled within the range of ±0.05 mm. In the two field curvature aberration diagrams of FIG. 23B and FIG. 23C, the focal length variation amount of the three representative wavelengths in the entire field of view is within ±0.09 mm. The distortion aberration diagram of FIG. 23 shows that the distortion aberration of the present embodiment is maintained within the range of ±12%.

It may be known from the above description that the half field of view of the fifth embodiment is larger than the half field of view of the first embodiment. Therefore, compared with the first embodiment, the fifth embodiment has a larger angular range for receiving an image. The aperture of the fifth embodiment is larger than the aperture of the first embodiment. Therefore, compared with the first embodiment, the fifth embodiment has a larger light influx. Furthermore, the distortion aberration of the fifth embodiment is smaller than the distortion aberration of the first embodiment.

FIG. 26 is a schematic of the optical imaging lens of the sixth embodiment of the invention. FIG. 27A to FIG. 27D are diagrams of the longitudinal spherical aberration and various aberrations of the optical imaging lens of the sixth embodiment. Referring first to FIG. 26, the sixth embodiment of the optical imaging lens 10 of the invention is substantially similar to the first embodiment, and the difference between the two is as follows: the optical data, the aspheric coefficients, and the parameters of the lens elements 1, 2, 3, 4, 5, 6, and 7 are slightly different. Moreover, in the present embodiment, the optical axis region 451 of the object-side surface 45 of the fourth lens element 4 is convex. The fifth lens element 5 has a negative refracting power. The optical axis region 651 of the object-side surface 65 of the sixth lens element 6 is convex. The seventh lens element 7 has a positive refracting power. The optical axis region 751 of the object-side surface 75 of the seventh lens element 7 is convex. It should be mentioned here that, to clearly show the Figure, in FIG. 26, the reference numerals of the optical axis region and the periphery region similar to the surface shape in the first embodiment are omitted.

The detailed optical data of the optical imaging lens 10 of the sixth embodiment is shown in FIG. 28, and the optical imaging lens 10 of the sixth embodiment has an effective focal length of 6.367 mm, a half field of view of 38.364 degrees, a system length of 7.869 mm, an f-number of 1.800, and an image height of 5.650 mm.

FIG. 29 shows each of the aspheric coefficients of the object-side surface 15 of the first lens element 1 to the image-side surface 76 of the seventh lens element 7 of the sixth embodiment in general formula (1).

Moreover, the relationship between each of the important parameters in the optical imaging lens 10 of the sixth embodiment is as shown in FIG. 39.

FIG. 27A illustrates the longitudinal spherical aberration of the sixth embodiment, in which the imaging point deviation of off-axis rays at different heights is controlled within the range of ±0.055 mm. In the two field curvature aberration diagrams of FIG. 27B and FIG. 27C, the focal length variation amount of the three representative wavelengths in the entire field of view is within ±0.06 mm. The distortion aberration diagram of FIG. 27 shows that the distortion aberration of the present embodiment is maintained within the range of ±14%.

It may be known from the above description that the system length of the sixth embodiment is shorter than the system length of the first embodiment. Therefore, compared with the first embodiment, the sixth embodiment has a smaller volume. The half field of view of the sixth embodiment is larger than the half field of view of the first embodiment. Therefore, compared with the first embodiment, the sixth embodiment has a larger angular range for receiving an image. The aperture of the sixth embodiment is larger than the aperture of the first embodiment. Therefore, compared with the first embodiment, the sixth embodiment has a larger light influx. In addition, the field curvature aberration of the sixth embodiment is smaller than the field curvature aberration of the first embodiment, and the distortion aberration of the sixth embodiment is smaller than the distortion aberration of the first embodiment.

FIG. 30 is a schematic of the optical imaging lens of the seventh embodiment of the invention. FIG. 31A to FIG. 31D are diagrams of the longitudinal spherical aberration and various aberrations of the optical imaging lens of the seventh embodiment. Referring first to FIG. 30, the seventh embodiment of the optical imaging lens 10 of the invention is substantially similar to the first embodiment, and the difference between the two is as follows: the optical data, the aspheric coefficients, and the parameters of the lens elements 1, 2, 3, 4, 5, 6, and 7 are slightly different. Furthermore, in the present embodiment, the third lens element 3 has a negative refracting power. The optical axis region 351 of the object-side surface 35 of the third lens element 3 is concave. The fourth lens element 4 has positive refracting power. The optical axis region 451 of the object-side surface 45 of the fourth lens element 4 is convex. The optical axis region 651 of the object-side surface 65 of the sixth lens element 6 is convex. It should be mentioned here that, to clearly show the Figure, in FIG. 30, the reference numerals of the optical axis region and the periphery region similar to the surface shape in the first embodiment are omitted.

The detailed optical data of the optical imaging lens 10 of the seventh embodiment is shown in FIG. 32, and the optical imaging lens 10 of the seventh embodiment has an effective focal length of 6.050 mm, a half field of view of 39.039 degrees, a system length of 7.971 mm, an f-number of 1.500, and an image height of 5.055 mm.

FIG. 33 shows each of the aspheric coefficients of the object-side surface 15 of the first lens element 1 to the image-side surface 76 of the seventh lens element 7 of the seventh embodiment in general formula (1).

Moreover, the relationship between each of the important parameters in the optical imaging lens 10 of the seventh embodiment is as shown in FIG. 39.

FIG. 31A illustrates the longitudinal spherical aberration of the seventh embodiment, in which the imaging point deviation of off-axis rays at different heights is controlled within the range of ±0.07 mm. In the two field curvature aberration diagrams of FIG. 31B and FIG. 31C, the focal length variation amount of the three representative wavelengths in the entire field of view is within ±0.07 mm. The distortion aberration diagram of FIG. 31 shows that the distortion aberration of the present embodiment is maintained within the range of ±4.5%.

It may be known from the above description that the half field of view of the seventh embodiment is larger than the half field of view of the first embodiment. Therefore, compared with the first embodiment, the seventh embodiment has a larger angular range for receiving an image. The aperture of the seventh embodiment is larger than the aperture of the first embodiment. Therefore, compared with the first embodiment, the seventh embodiment has a larger light influx. In addition, the field curvature aberration of the seventh embodiment is smaller than the field curvature aberration of the first embodiment, and the distortion aberration of the seventh embodiment is smaller than the distortion aberration of the first embodiment.

Figure 34:
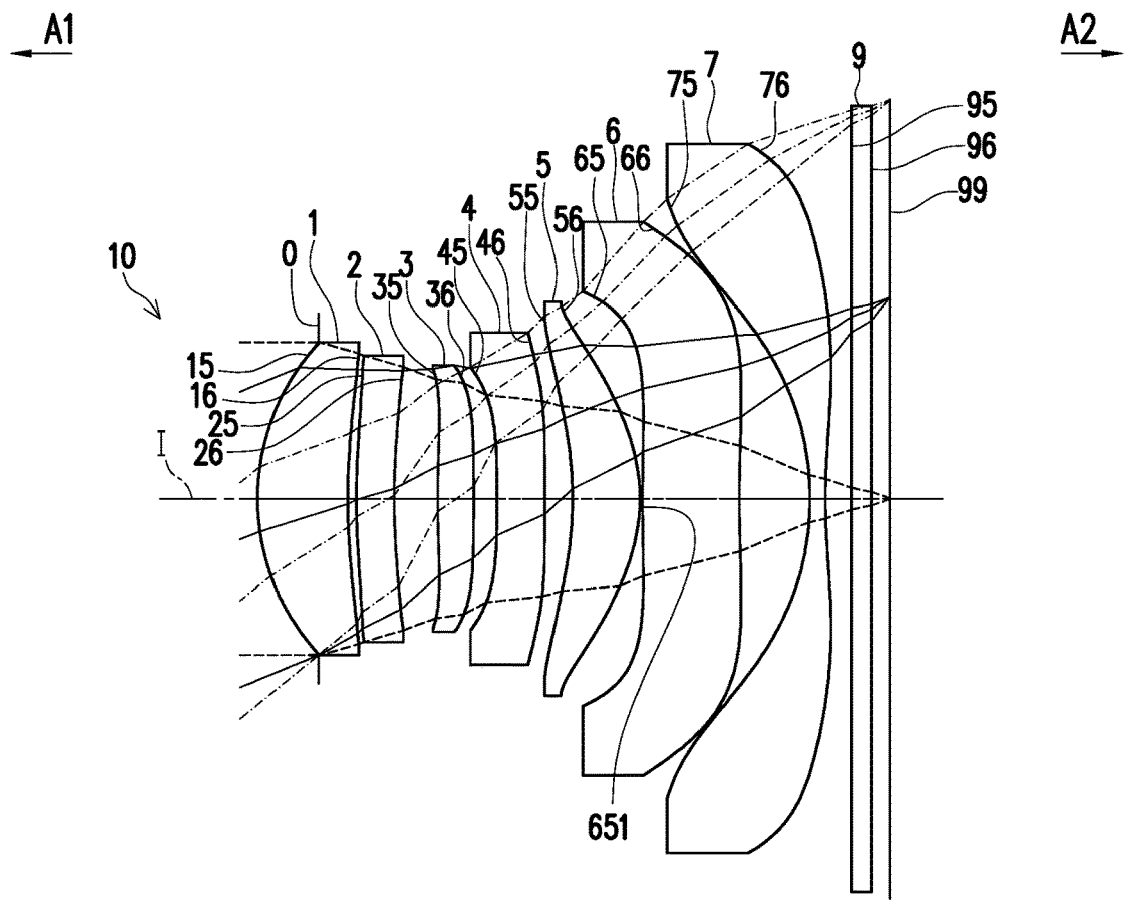
FIG. 34 is a schematic of the optical imaging lens of the eighth embodiment of the invention.

FIG. 34 is a schematic of the optical imaging lens of the eighth embodiment of the invention. FIG. 35A to FIG. 35D are diagrams of the longitudinal spherical aberration and various aberrations of the optical imaging lens of the eighth embodiment. Referring first to FIG. 34, the eighth embodiment of the optical imaging lens 10 of the invention is substantially similar to the first embodiment, and the difference between the two is as follows: the optical data, the aspheric coefficients, and the parameters of the lens elements 1, 2, 3, 4, 5, 6, and 7 are slightly different. Furthermore, in the present embodiment, the second lens element 2 has a positive refracting power. The optical axis region 651 of the object-side surface 65 of the sixth lens element 6 is convex.

It should be mentioned here that, to clearly show the Figure, in FIG. 34, the reference numerals of the optical axis region and the periphery region similar to the surface shape in the first embodiment are omitted.

The detailed optical data of the optical imaging lens 10 of the eighth embodiment is shown in FIG. 36, and the optical imaging lens 10 of the eighth embodiment has an effective focal length of 5.977 mm, a half field of view of 39.039 degrees, a system length of 8.048 mm, an f-number of 1.500, and an image height of 5.082 mm.

FIG. 37 shows each of the aspheric coefficients of the object-side surface 15 of the first lens element 1 to the image-side surface 76 of the seventh lens element 7 of the eighth embodiment in general formula (1).

Moreover, the relationship between each of the important parameters in the optical imaging lens 10 of the eighth embodiment is as shown in FIG. 39.

Figures 35A, 35B, 35C, 35D:
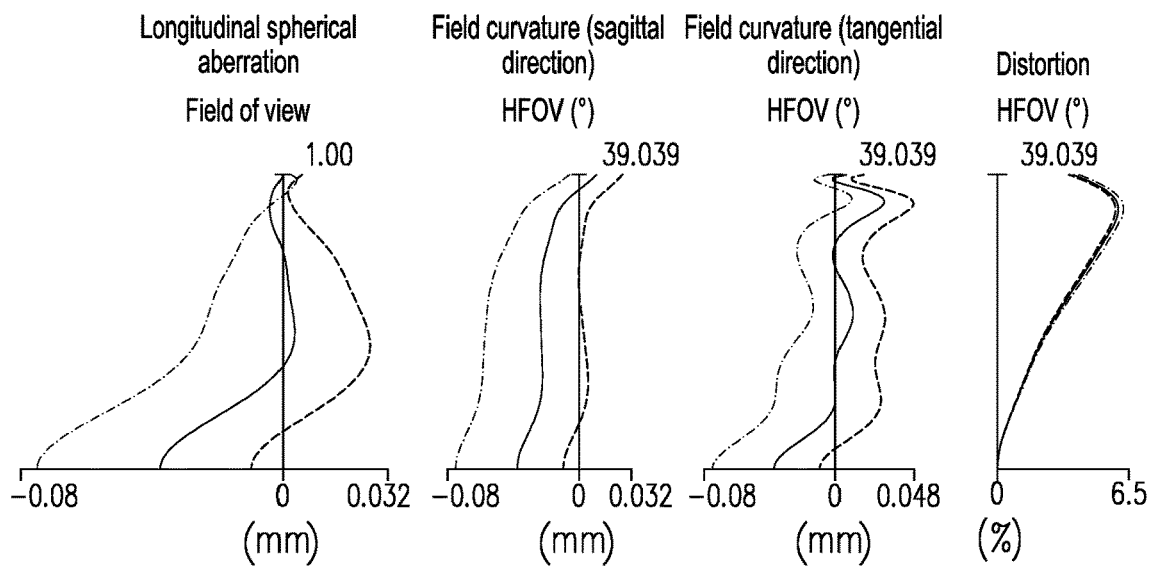
FIG. 35A to FIG. 35D are diagrams of the longitudinal spherical aberration and various aberrations of the optical imaging lens of the eighth embodiment.

FIG. 35A illustrates the longitudinal spherical aberration of the eighth embodiment, in which the imaging point deviation of off-axis rays at different heights is controlled within the range of ±0.08 mm. In the two field curvature aberration diagrams of FIG. 35B and FIG. 35C, the focal length variation amount of the three representative wavelengths in the entire field of view is within ±0.08 mm. The distortion aberration diagram of FIG. 35 shows that the distortion aberration of the present embodiment is maintained within the range of ±6.5%.

It may be known from the above description that the half field of view of the eighth embodiment is larger than the half field of view of the first embodiment. Therefore, compared with the first embodiment, the eighth embodiment has a larger angular range for receiving an image. The aperture of the eighth embodiment is larger than the aperture of the first embodiment. Therefore, compared with the first embodiment, the eighth embodiment has a larger light influx. Furthermore, the distortion aberration of the eighth embodiment is smaller than the distortion aberration of the first embodiment.

Referring further to FIG. 38 and FIG. 39, FIG. 38 is a table diagram of various optical parameters of the first embodiment to the fourth embodiment, and FIG. 39 is a table diagram of various optical parameters of the fifth embodiment to the eighth embodiment. It may be known from the optical imaging lens 10 of each embodiment above that, the optical imaging lens 10 of the invention satisfies that the first lens element 1 has positive refracting power, the periphery region 163 of the image-side surface 16 of the first lens element 1 is concave, and the sixth lens element 6 has negative refracting power, and when the optical imaging lens 10 satisfies (D11t31+ImgH)/Fno≥3.800 mm, it is beneficial to the design of a lens having a large aperture and a large image height, and the preferred limit is (D11t31+ImgH)/Fno≥4.000 mm. The optimal limit is 4.000 mm≤ (D11t31+ImgH)/Fno≤6.500 mm.

In addition, the optical imaging lens 10 of the invention further limits one of the technical feature combinations having the same effect in the following (a) to (c) conditions to help improve the yield of manufacturing the optical imaging lens 10 and enhance manufacturability:

(a) The optical axis region 361 of the image-side surface 36 of the third lens element 3 is convex, the optical axis region 461 of the image-side surface 46 of the fourth lens element 4 is concave, and the optical imaging lens 10 satisfies 3.000≤Tavg2345/Tstd2345. In particular, the preferred limit is 3.000≤Tavg2345/Tstd2345≤11.000. In addition, if the second lens element 2 has negative refracting power, it is more beneficial to control the turning of the light and eliminate the aberration in the inner field of view (0.2 to 0.4 Field);

(b) The optical axis region 461 of the image-side surface 46 of the fourth lens element 4 is concave, the optical axis region 551 of the object-side surface 55 of the fifth lens element 5 is concave, and the optical imaging lens 10 satisfies 3.000≤Tavg2345/Tstd2345. In particular, the preferred limit is 3.000≤Tavg2345/Tstd2345≤11.000. In addition, if the optical axis region 751 of the object-side surface 75 of the seventh lens element 7 is concave, it is more beneficial to correct the aberration of the inner field of view (0 to 0.2 Field);

(c) The optical axis region 361 of the image-side surface 36 of the third lens element 3 is convex, the periphery region 753 of the object-side surface 75 of the seventh lens element 7 is concave, the optical axis region 761 of the image-side surface 76 of the seventh lens element 7 is concave, and the optical imaging lens 10 satisfies V4+V5+V6+V7≤170.000. The preferred limit is 110.000≤V4+V5+V6+V7≤170.000, which is more beneficial to improve the modulation transfer function (MTF) of the inner field of view (0 to 0.2 Field) of the optical imaging lens 10.

In addition, when the optical imaging lens 10 of the invention satisfies V5+V7≤100.000 or V6+V7≤100.000, it is beneficial to improve the MTF of the optical imaging lens 10 and increase the resolution. The preferred limit is 38.000≤V5+V7≤100.000 or 38.000≤V6+V7≤100.000.

Moreover, under the premise that the optical imaging lens 10 of the invention satisfies the following conditional formula, which helps to provide a large aperture and a large image height lens, the thickness and interval of each lens are maintained at a suitable value, so as to avoid any parameter is too large and not conducive to the overall thinning of the optical imaging lens 10, or avoid any parameter that is too small and affecting assembly or increasing the difficulty of manufacture.

In particular, the optical imaging lens 10 may satisfy ALT*Fno/AAG≤3.700, and the preferred range is 2.000≤ALT*Fno/AAG≤3.700;

the optical imaging lens 10 may satisfy (G12+D41t61)/T1≤1.800, and the preferred range is 1.000≤(G12+D41t61)/T1≤1.800;

the optical imaging lens 10 may satisfy (G23+D41t61)/(T2+T3)≤2.700, and the preferred range is 1.600≤(G23+D41t61)/(T2+T3)≤2.700;

the optical imaging lens 10 may satisfy (D41t61+BFL)/(G67+T7)≤2.500, and the preferred range is 1.300≤(D41t61+BFL)/(G67+T7)≤2.500;

the optical imaging lens 10 may satisfy TL/D61t72≤3.500, and the preferred range is 2.900≤TL/D61t72≤3.500;

the optical imaging lens 10 may satisfy (EFL+ImgH)/Fno≥6.300 mm, and the preferred range is 6.300 mm≤(EFL+ImgH)/Fno≤9.200 mm;

the optical imaging lens 10 may satisfy (G23+G45+G56)/G34≤3.200, and the preferred range is 1.700≤(G23+G45+G56)/G34≤3.200;

the optical imaging lens 10 may satisfy D41t61/(G12+T2)≤4.200, and the preferred range is 2.300≤D41t61/(G12+T2)≤4.200;

the optical imaging lens 10 may satisfy TTL/(T1+D61t72)≤2.500, and the preferred range is 1.900≤TTL/(T1+D61t72)≤2.500;

the optical imaging lens 10 may satisfy (TTL+ImgH)/Fno≥7.000 mm, and the preferred range is 7.000 mm≤ (TTL+ImgH)/Fno≤11.000 mm;

the optical imaging lens 10 may satisfy (T3+D41t61+T6)/(T1+G12)≤3.000, and the preferred range is 1.800≤ (T3+D41t61+T6)/(T1+G12)≤3.000;

the optical imaging lens 10 may satisfy (T4+T6+T7)/T2≤4.800, and the preferred range is 3.300≤(T4+T6+T7)/T2≤4.800;

the optical imaging lens 10 may satisfy (G23+T3)/G34≤3.410, and the preferred range is 1.100≤(G23+T3)/G34≤3.410;

the optical imaging lens 10 may satisfy (D41t61+T6)/(T2+G34)≤4.200, and the preferred range is 2.500≤ (D41t61+T6)/(T2+G34)≤4.200; and the optical imaging lens 10 may satisfy (T3+T4+T5+T6+T7)/T1≤3.000, and the preferred range is 1.600≤(T3+T4+T5+T6+T7)/T1≤3.000.

In addition, any combination relationship of the parameters of the embodiments may also be selected to increase the lens limit, so as to facilitate the lens design of the same architecture of the invention.

Based on the unpredictability of the optical system design, under the designs of the invention, by satisfying the above conditional formulas, in the invention, lens length is reduced, usable aperture is increased, and imaging quality is increased, or assembly yield is increased to alleviate the drawbacks of the prior art.

The above-listed exemplary limiting relational expressions may also be combined arbitrarily in varying quantities and applied to the embodiments of the invention, and are not limited thereto. When the invention is implemented, in addition to the above relationship, additional detailed structures such as a concave-convex curved surface arrangement may also be designed for a single lens element or a wide range of lens elements to strengthen the control of system performance and/or resolution. It should be noted that these details need to be optionally combined and used in other embodiments of the invention without conflict.

The numerical ranges within the maximum and minimum values obtained by the combination ratio relationship of the optical parameters disclosed in each embodiment of the invention may be implemented accordingly.

The lens element of each embodiment of the invention adopts an aspherical design, which is more conducive to optimizing the imaging quality.

The selection of plastic materials for the lens element of each embodiment of the invention helps reduce weight, and may further reduce the weight and cost of the optical imaging lens.

The contents in the embodiments of the invention include but are not limited to a focal length, a thickness of a lens element, an Abbe number, or other optical parameters. For example, in the embodiments of the invention, an optical parameter A and an optical parameter B are disclosed, wherein the ranges of the optical parameters, comparative relation between the optical parameters, and the range of a conditional expression covered by a plurality of embodiments are specifically explained as follows:

(1) The ranges of the optical parameters are, for example, $\alpha_2 \leq A \leq \alpha_1$ or $\beta_2 \leq B \leq \beta_1$, where $\alpha_1$ is a maximum value of the optical parameter A among the plurality of embodiments, $\alpha_2$ is a minimum value of the optical parameter A among the plurality of embodiments, $\beta_1$ is a maximum value of the optical parameter B among the plurality of embodiments, and $\beta_2$ is a minimum value of the optical parameter B among the plurality of embodiments.

(2) The comparative relation between the optical parameters is that A is greater than B or A is less than B, for example.

(3) The range of a conditional expression covered by a plurality of embodiments is in detail a combination relation or proportional relation obtained by a possible operation of a plurality of optical parameters in each same embodiment. The relation is defined as E, and E is, for example, A+B or A−B or AB or A*B or $(A*B)^{1/2}$, and E satisfies a conditional expression $E \leq \gamma_1$ or $E \geq \gamma_2$ or $\gamma_2 \leq E \leq \gamma_1$, where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the invention. The aforementioned description is for exemplary explanation, but the invention is not limited thereto.

The embodiments of the invention are all implementable. In addition, a combination of partial features in a same embodiment can be selected, and the combination of partial features can achieve the unexpected result of the invention with respect to the prior art. The combination of partial features includes but is not limited to the surface shape of a lens element, a refracting power, a conditional expression or the like, or a combination thereof. The description of the embodiments is for explaining the specific embodiments of the principles of the invention, but the invention is not limited thereto. Specifically, the embodiments and the drawings are for exemplifying, but the invention is not limited thereto.

Although the invention has been described with reference to the above embodiments, it will be apparent to one of ordinary skill in the art that modifications to the described embodiments may be made without departing from the spirit of the disclosure. Accordingly, the scope of the disclosure is defined by the attached claims not by the above detailed descriptions.

What is claimed is:

1. An optical imaging lens, comprising a first lens element, a second lens element, a third lens element, a fourth lens element, a fifth lens element, a sixth lens element, and a seventh lens element sequentially arranged along an optical axis from an object side to an image side, wherein each of the first lens element to the seventh lens element comprises an object-side surface facing the object side and allowing an imaging ray to pass through and an image-side surface facing the image side and allowing the imaging ray to pass through;

the first lens element has positive refracting power, and a periphery region of the image-side surface of the first lens element is concave;

the second lens element has negative refracting power;

an optical axis region of the image-side surface of the third lens element is convex;

an optical axis region of the image-side surface of the fourth lens element is concave;

a periphery region of the image-side surface of the fifth lens element is convex; and the sixth lens element has negative refracting power;

wherein lens elements of the optical imaging lens are only the seven lens elements described above, and the following conditional formulas are satisfied:

3.800 mm ≤ (D1t31+ImgH)/Fno and 3.000 ≤ Tavg2345/Tstd2345, wherein D1t31 is a distance from the object-side surface of the first lens element to the object-side surface of the third lens element on the optical axis, ImgH is an image height of the optical imaging lens, Fno is an f-number of the optical imaging lens, Tavg2345 is an average value of a thickness from the second lens element to the fifth lens element on the optical axis, and Tstd2345 is a standard deviation of the thickness from the second lens element to the fifth lens element on the optical axis.

2. The optical imaging lens of claim 1, wherein the optical imaging lens satisfies the following conditional formula: ALT*Fno/AAG ≤ 3.700, wherein ALT is a sum of thicknesses of the seven lens elements from the first lens element to the seventh lens element on the optical axis, and AAG is a sum of six air gaps from the first lens element to the seventh lens element on the optical axis.

3. The optical imaging lens of claim 1, wherein the optical imaging lens satisfies the following conditional formula: (G12+D41t61)/T1 ≤ 1.800, wherein G12 is an air gap from the first lens element to the second lens element on the optical axis, D41t61 is a distance from the object-side surface of the fourth lens element to the object-side surface of the sixth lens element on the optical axis, and T1 is a thickness of the first lens element on the optical axis.

4. The optical imaging lens of claim 1, wherein the optical imaging lens satisfies the following conditional formula: (G23+D41t61)/(T2+T3) ≤ 2.700, wherein G23 is an air gap from the second lens element to the third lens element on the optical axis, D41t61 is a distance from the object-side surface of the fourth lens element to the object-side surface of the sixth lens element on the optical axis, T2 is a thickness of the second lens element on the optical axis, and T3 is a thickness of the third lens element on the optical axis.

5. The optical imaging lens of claim 1, wherein the optical imaging lens satisfies the following conditional formula: (D41t61+BFL)/(G67+T7) ≤ 2.500, wherein D41t61 is a distance from the object-side surface of the fourth lens element to the object-side surface of the sixth lens element on the optical axis, BFL is a distance from the image-side surface of the seventh lens element to an image plane on the optical axis, G67 is an air gap from the sixth lens element and the seventh lens element on the optical axis, and T7 is a thickness of the seventh lens element on the optical axis.

6. The optical imaging lens of claim 1, wherein the optical imaging lens satisfies the following conditional formula: TL/D61t72 ≤ 3.500, wherein TL is a distance from the object-side surface of the first lens element to the image-side surface of the seventh lens element on the optical axis, and D61t72 is a distance from the object-side surface of the sixth lens element to the image-side surface of the seventh lens element on the optical axis.

7. The optical imaging lens of claim 1, wherein the optical imaging lens further satisfies the following conditional formula: 6.300 mm ≤ (EFL+ImgH)/Fno, wherein EFL is an effective focal length of the optical imaging lens.

8. An optical imaging lens, comprising a first lens element, a second lens element, a third lens element, a fourth lens element, a fifth lens element, a sixth lens element, and a seventh lens element sequentially arranged along an optical axis from an object side to an image side, wherein each of the first lens element to the seventh lens element comprises an object-side surface facing the object side and allowing an imaging ray to pass through and an image-side surface facing the image side and allowing the imaging ray to pass through;

the first lens element has positive refracting power, and a periphery region of the image-side surface of the first lens element is concave;
an optical axis region of the image-side surface of the fourth lens element is concave;
an optical axis region of the object-side surface of the fifth lens element is concave;
the sixth lens element has negative refracting power; and
an optical axis region of the object-side surface of the seventh lens element is concave;
wherein lens elements of the optical imaging lens are only the seven lens elements described above, and the following conditional formulas are satisfied:

4.000 mm ≤ (D1t31+ImgH)/Fno and 3.000 ≤ Tavg2345/Tstd2345, wherein D1t31 is a distance from the object-side surface of the first lens element to the object-side surface of the third lens element on the optical axis, ImgH is an image height of the optical imaging lens, Fno is an f-number of the optical imaging lens, Tavg2345 is an average value of a thickness from the second lens element to the fifth lens element on the optical axis, and Tstd2345 is a standard deviation of the thickness from the second lens element to the fifth lens element on the optical axis.

9. The optical imaging lens of claim 8, wherein the optical imaging lens further satisfies the following conditional formula: V5+V6 ≤ 100.000, wherein V5 is an Abbe number of the fifth lens element, and V6 is an Abbe number of the sixth lens element.

10. The optical imaging lens of claim 8, wherein the optical imaging lens further satisfies the following conditional formula: V6+V7 ≤ 100.000, wherein V6 is an Abbe number of the sixth lens element, and V7 is an Abbe number of the seventh lens element.

11. The optical imaging lens of claim 8, wherein the optical imaging lens further satisfies the following conditional formula: (G23+G45+G56)/G34 ≤ 3.200, wherein G23 is an air gap from the second lens element to the third lens element on the optical axis, G45 is an air gap from the fourth lens element to the fifth lens element on the optical axis, G56 is an air gap from the fifth lens element to the sixth lens element on the optical axis, and G34 is an air gap from the third lens element to the fourth lens element on the optical axis.

12. The optical imaging lens of claim 8, wherein the optical imaging lens satisfies the following conditional formula: D41t61/(G12+T2) ≤ 4.200, wherein D41t61 is a distance from the object-side surface of the fourth lens element to the object-side surface of the sixth lens element on the optical axis, G12 is an air gap from the first lens element to the second lens element on the optical axis, and T2 is a thickness of the second lens element on the optical axis.

13. The optical imaging lens of claim 8, wherein the optical imaging lens satisfies the following conditional formula: TTL/(T1+D61t72) ≤ 2.500, wherein TTL is a distance from the object-side surface of the first lens element to an image plane on the optical axis, T1 is a thickness of the first lens element on the optical axis, and D61t72 is a distance from the object-side surface of the sixth lens element to the image-side surface of the seventh lens element on the optical axis.

14. The optical imaging lens of claim 8, wherein the optical imaging lens further satisfies the following conditional formula: 7.000 mm ≤ (TTL+ImgH)/Fno, wherein TTL is a distance from the object-side surface of the first lens element to an image plane on the optical axis.

15. An optical imaging lens, comprising a first lens element, a second lens element, a third lens element, a fourth lens element, a fifth lens element, a sixth lens element, and a seventh lens element sequentially arranged along an optical axis from an object side to an image side, wherein each of the first lens element to the seventh lens element comprises an object-side surface facing the object side and allowing an imaging ray to pass through and an image-side surface facing the image side and allowing the imaging ray to pass through;
   the first lens element has positive refracting power, and a periphery region of the image-side surface of the first lens element is concave;
   an optical axis region of the image-side surface of the third lens element is convex;
   the sixth lens element has negative refracting power; and
   a periphery region of the object-side surface of the seventh lens element is concave and an optical axis region of the image-side surface of the seventh lens element is concave;
   wherein lens elements of the optical imaging lens are only the seven lens elements described above, and the following conditional formulas are satisfied:
   4.000 mm≤(D11t31+ImgH)/Fno and V4+V5+V6+V7≤170.000, wherein D11t31 is a distance from the object-side surface of the first lens element to the object-side surface of the third lens element on the optical axis, ImgH is an image height of the optical imaging lens, Fno is an f-number of the optical imaging lens, V4 is an Abbe number of the fourth lens element, V5 is an Abbe number of the fifth lens element, V6 is an Abbe number of the sixth lens element, and V7 is an Abbe number of the seventh lens element.

16. The optical imaging lens of claim 15, wherein the optical imaging lens satisfies the following conditional formula: (T3+D41t61+T6)/(T1+G12)≤3.000, wherein T3 is a thickness of the third lens element on the optical axis, D41t61 is a distance from the object-side surface of the fourth lens element to the object-side surface of the sixth lens element on the optical axis, T6 is a thickness of the sixth lens element on the optical axis, T1 is a thickness of the first lens element on the optical axis, and G12 is an air gap from the first lens element to the second lens element on the optical axis.

17. The optical imaging lens of claim 15, wherein the optical imaging lens satisfies the following conditional formula: (T4+T6+T7)/T2≤4.800, wherein T4 is a thickness of the fourth lens element on the optical axis, T6 is a thickness of the sixth lens element on the optical axis, T7 is a thickness of the seventh lens element on the optical axis, and T2 is a thickness of the second lens element on the optical axis.

18. The optical imaging lens of claim 15, wherein the optical imaging lens satisfies the following conditional formula: (G23+T3)/G34≤3.410, wherein G23 is an air gap from the second lens element to the third lens element on the optical axis, T3 is a thickness of the third lens element on the optical axis, and G34 is an air gap from the third lens element to the fourth lens element on the optical axis.

19. The optical imaging lens of claim 15, wherein the optical imaging lens satisfies the following conditional formula: (D41t61+T6)/(T2+G34)≤4.200, wherein D41t61 is a distance from the object-side surface of the fourth lens element to the object-side surface of the sixth lens element on the optical axis, T6 is a thickness of the sixth lens element on the optical axis, T2 is a thickness of the second lens element on the optical axis, and G34 is an air gap from the third lens element to the fourth lens element on the optical axis.

20. The optical imaging lens of claim 15, wherein the optical imaging lens satisfies the following conditional formula: (T3+T4+T5+T6+T7)/T1≤3.000, wherein T3 is a thickness of the third lens element on the optical axis, T4 is a thickness of the fourth lens element on the optical axis, T5 is a thickness of the fifth lens element on the optical axis, T6 is a thickness of the sixth lens element on the optical axis, T7 is a thickness of the seventh lens element on the optical axis, and T1 is a thickness of the first lens element on the optical axis.

* * * * *